US012776040B2

(12) United States Patent
Kim et al.

(10) Patent No.: US 12,776,040 B2
(45) Date of Patent: Oct. 27, 2026

(54) ELECTRONIC DEVICE COMPRISING FLEXIBLE DISPLAY AND STORING VIDEO FOR VARIABLE SCREEN SIZES

(71) Applicant: Samsung Electronics Co., Ltd., Suwon-si (KR)

(72) Inventors: Hyeryoung Kim, Suwon-si (KR); Sanghyuk Koh, Suwon-si (KR); Hanchul Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 18/309,358

(22) Filed: Apr. 28, 2023

(65) Prior Publication Data

US 2023/0267617 A1 Aug. 24, 2023

Related U.S. Application Data

(63) Continuation of application No. PCT/KR2021/018245, filed on Dec. 3, 2021.

(30) Foreign Application Priority Data

Dec. 3, 2020 (KR) ........................ 10-2020-0167754
Dec. 16, 2020 (KR) ........................ 10-2020-0176572

(51) Int. Cl.
*G06F 1/16* (2006.01)
*G06T 7/11* (2017.01)
*H04M 1/02* (2006.01)

(52) U.S. Cl.
CPC .............. *G06T 7/11* (2017.01); *G06F 1/1652* (2013.01); *H04M 1/0268* (2013.01); *G06T 2207/20132* (2013.01)

(58) Field of Classification Search
CPC ............. G06T 7/11; G06T 2207/20132; G06F 1/1652; G06F 2200/1614;
(Continued)

(56) References Cited

U.S. PATENT DOCUMENTS 9,318,070 B2 * 4/2016 Park ...................... G06F 1/1626
10,013,955 B2 7/2018 Oh et al.
(Continued)

FOREIGN PATENT DOCUMENTS

CN 109600659 A 4/2019
CN 110087123 A 8/2019
(Continued)

OTHER PUBLICATIONS

Why should you see the movie <Captain Marvel> in ScreenX?, Feb. 27, 2019, URL: https://blog.naver.com/gomsolvie/221475925222.
(Continued)

*Primary Examiner* — Juan M Guillermety
(74) *Attorney, Agent, or Firm* — Jefferson IP Law, LLP

(57) ABSTRACT

An electronic device is provided. The electronic device includes a memory, a display having a flexible structure, at least one sensor configured to detect a change in screen size of the display, and at least one processor connected to the memory, the display, and the at least one sensor, wherein the memory is configured to store instructions that, when executed, cause the at least one processor to record a video of a screen of the display, based on a reference screen size equal to or greater than an actual screen size, and store a video in which a dummy area corresponding to a difference between the actual screen size and the reference screen size is cropped from the recorded video.

15 Claims, 25 Drawing Sheets

(58) Field of Classification Search
CPC ......... G06F 2203/04803; G06F 1/1624; G06F 1/1677; G06F 1/1694; G06F 3/0481; G06F 3/04845; G06F 3/04886; H04M 1/0268; H04M 1/0235; H04M 1/0241; G09F 9/301; H04N 21/4314; H04N 21/4402; H04N 21/41407; H04N 5/92; H04N 21/42653; H04N 21/4334; H04N 21/47
See application file for complete search history.

(56) References Cited

U.S. PATENT DOCUMENTS

| | | | | |
|---|---|---|---|---|
| 10,051,188 | B2 | 8/2018 | Nagano et al. | |
| 10,958,853 | B2 | 3/2021 | Kwak | |
| 11,144,201 | B2 | 10/2021 | Cui | |
| 11,252,826 | B2 | 2/2022 | Park et al. | |
| 11,445,255 | B2 | 9/2022 | Li | |
| 11,457,273 | B2 | 9/2022 | Seo et al. | |
| 12,136,219 | B2 * | 11/2024 | Choi | H04M 1/0237 |
| 2009/0051830 | A1 | 2/2009 | Matsushita et al. | |
| 2014/0098095 | A1 | 4/2014 | Lee et al. | |
| 2014/0189583 | A1 * | 7/2014 | Yang | G06F 3/04883 715/800 |
| 2016/0050368 | A1 * | 2/2016 | Seo | G06T 7/194 348/36 |
| 2016/0134737 | A1 * | 5/2016 | Pulletikurty | G06F 3/0485 715/735 |
| 2018/0348992 | A1 * | 12/2018 | Ku | H04N 21/47217 |
| 2019/0261519 | A1 * | 8/2019 | Park | G06F 1/1624 |
| 2019/0346954 | A1 * | 11/2019 | Jung | G06F 1/1624 |
| 2019/0384438 | A1 * | 12/2019 | Park | G06F 1/1677 |
| 2020/0195877 | A1 * | 6/2020 | Li | G06F 3/04812 |
| 2021/0084372 | A1 * | 3/2021 | Seo | H04N 21/47217 |
| 2022/0159183 | A1 * | 5/2022 | Li | H04N 5/772 |
| 2022/0319009 | A1 | 10/2022 | Choi et al. | |

FOREIGN PATENT DOCUMENTS

| | | | |
|---|---|---|---|
| CN | 110417991 | A | 11/2019 |
| CN | 111727423 | A | 9/2020 |
| JP | 5351114 | B2 | 11/2013 |
| KR | 10-0672431 | B1 | 1/2007 |
| KR | 10-2007-0044303 | A | 4/2007 |
| KR | 10-2015-0064756 | A | 6/2015 |
| KR | 10-2017-0043347 | A | 4/2017 |
| KR | 10-2017-0062121 | A | 6/2017 |
| KR | 10-2017-0083404 | A | 7/2017 |
| KR | 10-2018-0037370 | A | 4/2018 |
| KR | 10-2019-0088406 | A | 7/2019 |
| KR | 10-2019-0101184 | A | 8/2019 |
| KR | 10-2163740 | B1 | 10/2020 |
| WO | 2020/094089 | A1 | 5/2020 |

OTHER PUBLICATIONS

Korean Office Action dated Mar. 20, 2025, issued in Korean Patent Application No. 10-2020-0176572.
International Search Report dated Mar. 24, 2022, issued in International Application No. PCT/KR2021/018245.
Extended European Search Report dated Feb. 14, 2024, issued in European Patent Application No. 21901076.6.
Korean Office Action dated Nov. 21, 2025, issued in Korean Application No. 10-2020-0176572.
Chinese Office Action dated Jun. 23, 2026, issued in Chinese Application No. 202180081477.5.
Notice of Patent Grant dared Apr. 18, 2026, issued in Korean Application No. 10-2020-0176572.
Indian Office Action dated Jul. 2, 2026, issued in Indian Application No. 202317035626.

* cited by examiner

ELECTRONIC DEVICE COMPRISING FLEXIBLE DISPLAY AND STORING VIDEO FOR VARIABLE SCREEN SIZES

CROSS-REFERENCE TO RELATED APPLICATION(S)

This application is a continuation application, claiming priority under § 365(c), of an International application No. PCT/KR2021/018245, filed on Dec. 3, 2021, which is based on and claims the benefit of a Korean patent application number 10-2020-0167754, filed on Dec. 3, 2020, in the Korean Intellectual Property Office, and of Korean patent application number 10-2020-0176572, filed on Dec. 16, 2020, the disclosure of each of which is incorporated by reference herein in its entirety.

BACKGROUND

1. Field

The disclosure relates to an electronic device including a flexible display.

2. Description of Related Art

Recently, the use of flexible-type electronic devices capable of changing the physical shape of a display area is increasing. For example, for a foldable, rollable, or slidable electronic device, a structure capable of expanding or reducing a display area is employed, thereby expanding the size of the display area as needed to provide a wide screen while maintaining portability.

A mechanical state of the flexible-type electronic device may be changed by an input according to a user's operation (e.g., sliding in/out). For example, a state in which a part of the flexible display is drawn (reduced) into the electronic device may be changed to a state in which the part of the flexible display is drawn out (expanded) of the electronic device.

The above information is presented as background information only to assist with an understanding of the disclosure. No determination has been made, and no assertion is made, as to whether any of the above might be applicable as prior art with regard to the disclosure.

SUMMARY

In fixed-type electronic devices having a fixed screen area size, a screen recording function may be used in a predetermined format. One video file may have one fixed format.

Unlike fixed-type electronic devices, flexible-type electronic devices may have a screen size variable at any time.

When the screen size is changed during screen recording in the flexible-type electronic device, the electronic device may not properly recognize a recording area or the recording area may be cut off. Application of a dynamically variable video format may be required instead of one fixed video format.

Aspects of the disclosure are to address at least the above-mentioned problems and/or disadvantages and to provide at least the advantages described below. Accordingly, an aspect of the disclosure is to provide an electronic device comprising flexible display.

Additional aspects will be set forth in part in the description which follows and, in part, will be apparent from the description, or may be learned by practice of the presented embodiments.

In accordance with an aspect of the disclosure, an electronic device is provided. The electronic device includes a memory, a display having a flexible structure, at least one sensor configured to detect a change in screen size of the display, and at least one processor connected to the memory, the display, and the at least one sensor. The memory may store instructions that, when executed, cause the at least one processor to record a video of a screen of the display, based on a reference screen size equal to or greater than an actual screen size, and store a video in which a dummy area corresponding to a difference between the actual screen size and the reference screen size is cropped from the recorded video.

The instructions may cause the at least one processor to detect, through the at least one sensor, whether the screen size of the display has been changed during recording, and when the screen size of the display has been changed, record the screen of the display, based on the reference screen size.

When a partial recording area is configured on the screen of the display, a video in which an area other than the partial recording area is additionally cropped from the recorded video may be stored.

In accordance with another aspect of the disclosure, an electronic device is provided. The electronic device includes a memory, a display having a flexible structure, a sensor module configured to detect a change in screen size of the display, and at least one processor connected to the memory, the display, and the at least one sensor. The memory may store instructions that, when executed, cause the at least one processor to receive a request to reproduce a video in which a screen of the display is recorded, identify a change in sizes of recording areas in the video corresponding to frames of the video, and reproduce the video, based on the change in sizes of recording areas in the video to display the reproduced video on the display.

According to various embodiments, a flexible-type electronic device provides an adaptive screen recording function considering changes in screen size in order to improve usability thereof.

The flexible-type electronic device may prevent a phenomenon in which a recording area is not properly recognized or a recording area is cut off due to a change in screen size.

The flexible-type electronic device provides a flexible video format capable of covering a change in screen size by extending a fixed video format.

The flexible-type electronic device provides an adaptive screen reproduction function considering a change in size of a video/screen.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
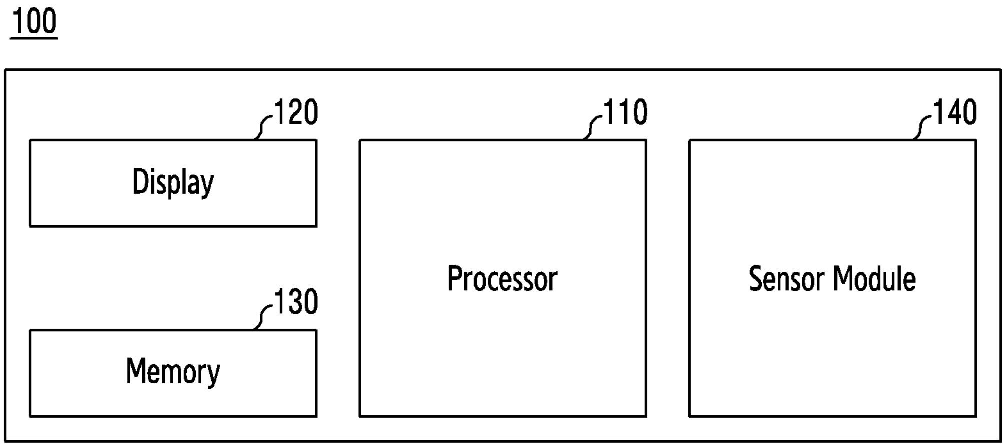
FIG. 1 is a block diagram of an electronic device according to an embodiment of the disclosure.

FIG. 1 is a block diagram of an electronic device according to an embodiment of the disclosure.

Referring to FIG. 1, an electronic device 100 according to an embodiment may include a memory 130, a display 120, a sensor module 140, and at least one processor 110.

The memory 130, the display 120, the sensor module 140, and the at least one processor 110 included in the electronic device 100 may be electrically and/or operatively connected to each other so as to exchange signals (e.g., commands or data) with each other.

The electronic device 100 may include at least a part of the electronic device 1801 shown in FIG. 18 to be described later. For example, the display 120 may be the display module 1860 of FIG. 18. The processor 110 may be the processor (one of processor 1820, 1821 or 1823) of FIG. 18. The sensor module 140 may include a part of the sensor module 1876 of FIG. 18.

The display 120 may have a flexible structure.

The sensor module 140 may include at least one sensor. The at least one sensor may detect a change in screen size of the display 120.

In an embodiment, the processor 110 may record the screen of the display 120.

The processor 110 may record the screen of the display 120, based on a reference screen size equal to or greater than the actual screen size of the display 120. The processor 110 may store, as an actual recorded video, a video in which a video of a dummy area corresponding to the difference between the actual screen size and the reference screen size is cropped from a recorded video.

The reference screen size may be the maximum screen size when the display 120 is maximally expanded.

A dummy area may be identified in a recorded video, based on the difference between the actual screen size and the reference screen size. A video of the dummy area may be cropped and removed from the recorded video. A video in which a video of the dummy area is cropped from the recorded video may be stored as an actual recorded video.

The processor 110 may detect, through at least one sensor in the sensor module 140, whether the screen size of the display 120 has been changed during recording. When the screen size of the display 120 has been changed, the processor 110 may record the screen of the display 120, based on the reference screen size.

While the screen size of the display 120 is fixed, the screen of the display 120 may be recorded based on the fixed screen size. The recorded video may be stored as a first video. When the screen size of the display 120 has been changed, the screen of the display 120 may be recorded based on the reference screen size. A second video in which a video of a dummy area is cropped from the recorded video may be stored. The first video and the second video may be combined into one file and stored as an actual recorded video.

A video having a smaller size between the first video and the second video may be modified and stored based on the reference video size. The reference video size may be any one of a size of a video corresponding to the reference screen size or a size of a video having a larger size between the first video and the second video.

When a partial recording area is configured on the screen of the display 120, a video in which the area other than the partial recording area is additionally cropped from the recorded video may be stored as an actual recorded video.

While the screen size of the display 120 is fixed, the screen of the display 120 may be recorded based on the fixed screen size. A first partial recorded video corresponding to the partial recording area in the recorded video may be stored. When the screen size of the display 120 has been changed, the screen of the display 120 may be recorded based on the reference screen size. A second partial recorded video corresponding to the partial recording area in the recorded video may be stored. The first partial recorded video and the second partial recorded video may be stored as one video. The processor 110 may modify the size of at least one of the first partial recorded video and the second partial recorded video such that the first partial recorded video and the second partial recorded video have a predetermined format (e.g., size-related attribute).

An actual screen size may be determined based on the screen size changing while recording is performed.

The actual screen size may be the maximum screen size while recording is performed. The maximum screen size while recording is performed (during recording) is the largest value among actual screen sizes and may be distinguished from the maximum screen size according to the maximally expanded display 120. The maximum screen size while recording is performed may be referred to as the maximum screen size during recording.

Information on changes in screen size of the display 120 while recording is performed may be stored. The screen size change information may be stored together with the recorded video. The stored screen size change information may be used to reproduce the recorded video.

In an embodiment, for recording a screen and/or reproducing a recorded video, the screen/video ratio may be considered along with the screen/video size.

For example, a screen ratio may be changed in response to a change in screen size of the display 120. The screen of the display 120 may be recorded based on the reference screen size and reference screen ratio. A video may be stored based on the actual screen size and actual screen ratio.

The processor 110 may reproduce and display the stored video on the display 120. The memory 130 may store instructions that, when executed, cause the processor 110 to reproduce and display the stored video on the display 120.

In an embodiment, the processor 110 may reproduce and display, on the display 120, a video in which the screen of the display 120 is recorded.

The processor 110 may receive a request to reproduce a video in which the screen of the display 120 is recorded. The processor 110 may reproduce the video, based on the current screen size of the display 120 and the size of the video to display the video on the display 120. The size of the video may correspond to the actual screen size of a plurality of recording areas within the video.

The actual screen size may be understood as the maximum screen size during recording. For example, when the size of a recording area within a video is fixed, the actual screen size may be the fixed size. As another example, when the size of the recording area has been changed within the video, the actual screen size may be the maximum size among the sizes of a plurality of recording areas within the video.

A frame (or video) of the video may include an actual recording area of a first size and a dummy area corresponding to the difference between the first size and the maximum screen size of the display 120 and then be displayed.

When the current screen size of the display 120 is the same as the size of a video, the video may be displayed in a state in which the current screen size and the size of the video are maintained.

When the current screen size of the display 120 is different from the size of the video, the center of the video may be displayed in the middle of the current screen of the display 120, or the video may be scaled and displayed so as to correspond to the current screen size.

While video reproduction is performed, the processor 110 may detect a change in screen size of the display 120 through the at least one sensor in the sensor module 140. The processor 110 may reproduce and display the video, based on a changed screen size of the display 120 and the size of the video.

When the size of the recording area has been changed within the video, the video may be displayed to show the change in size of the recording area while the screen size of the display 120 is fixed.

When the current screen size of the display 120 is different from the size of the video, the screen size of the display 120 may be changed to correspond to the size of the video. The video may be displayed through the resized screen.

When the size of the recording area has been changed within the video, the screen size of the display 120 may be changed to correspond to the change in size of the recording area. The video may be displayed through the resized screen.

In various embodiments, the processor 110 may control screen recording of the display 120 and reproduction of the recorded video, based on the size of the screen or the size of the video (or frame of the video).

In various embodiments, a "screen" may be understood as a physical screen of the electronic device 100 or display 120 or a virtual screen displayed through the physical screen.

"Screen size" may be understood as attribute related to a screen size. For example, a screen size may be at least one of a screen width (horizontal), a screen height (vertical), width and height of a screen, and a screen ratio (aspect ratio).

"Size of a video (or frame of a video)" may be understood as attribute related to the size of a video (or frame of a video). For example, the size of the video may be at least one of a video width, a video height (length), width and height of a video, and a video ratio (aspect ratio).

A change in size (e.g., width and height) of a screen or video may be linked to a change in ratio of the screen or video. The ratio of a screen or video may change depending on the size of the screen or video. For example, when the screen size has been changed due to the expansion or reduction of the screen, the screen ratio (e.g., aspect ratio) may be changed to correspond to the screen size. The size of the video obtained by recording the screen may be changed according to the change in size of the screen. The ratio of the video may be changed in response to the change in size of the video.

Figure 2A:
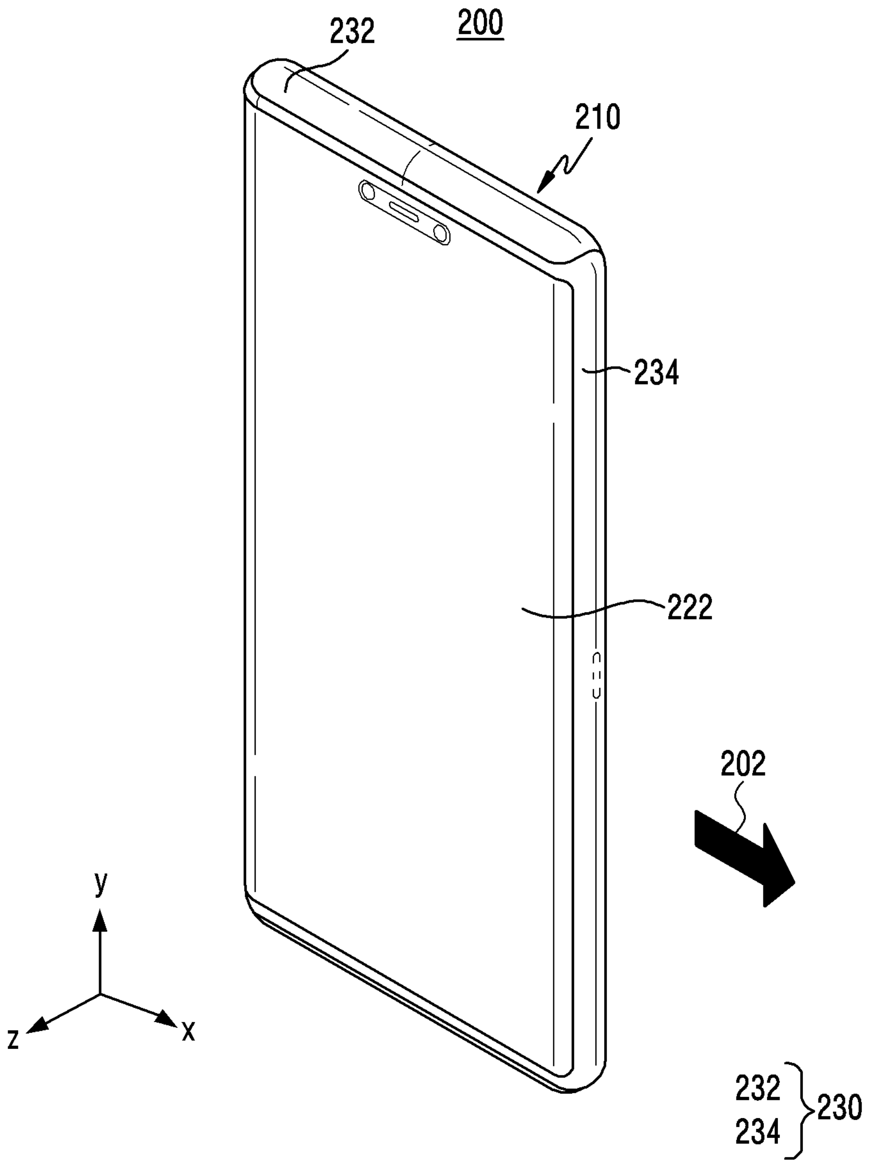
FIG. 2A is a front perspective view of an electronic device in a sliding-in state according to an embodiment of the disclosure.
Figure 2B:
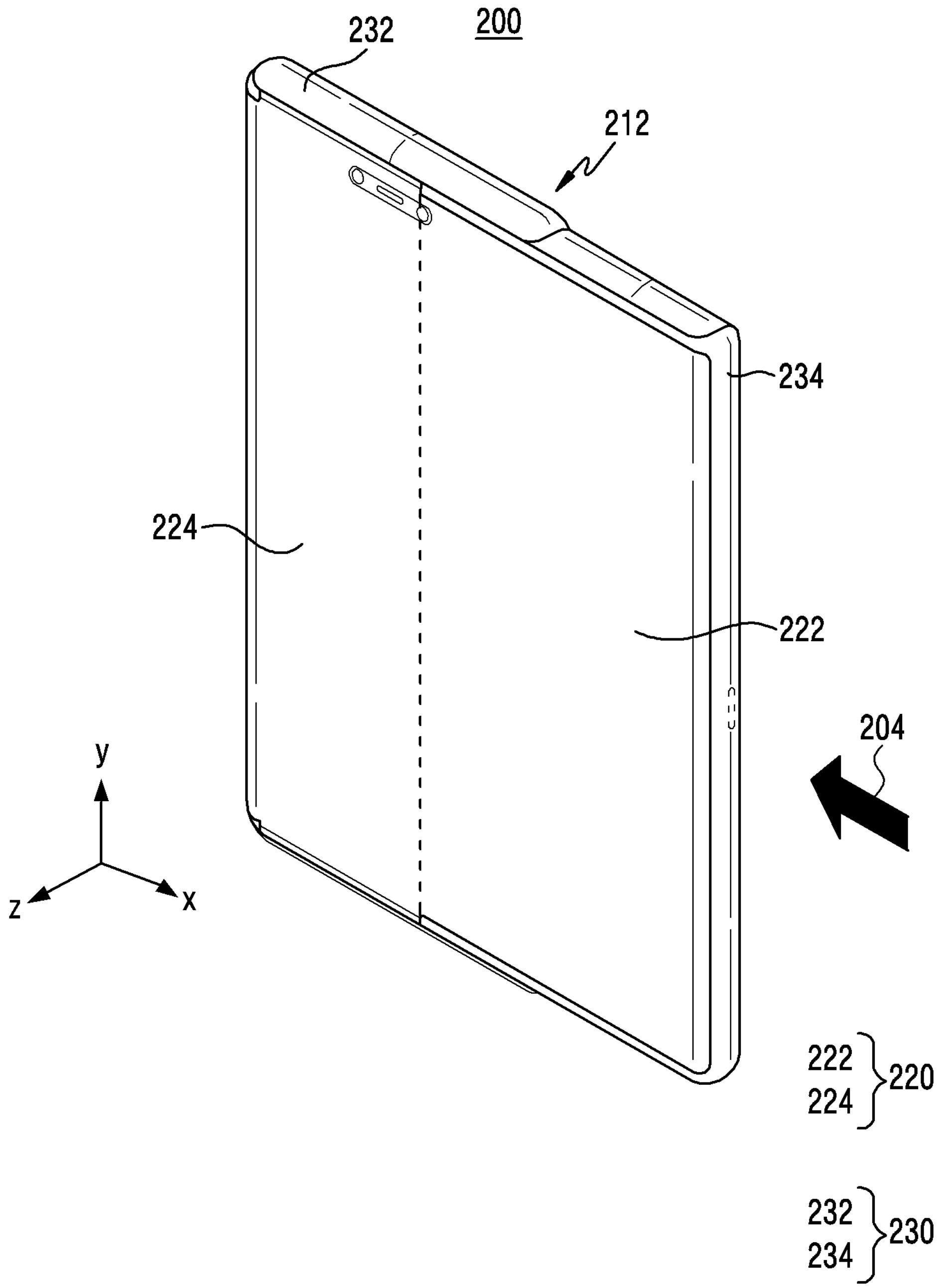
FIG. 2B is a front perspective view of an electronic device in a sliding-out state according to an embodiment of the disclosure.
Figure 3A:
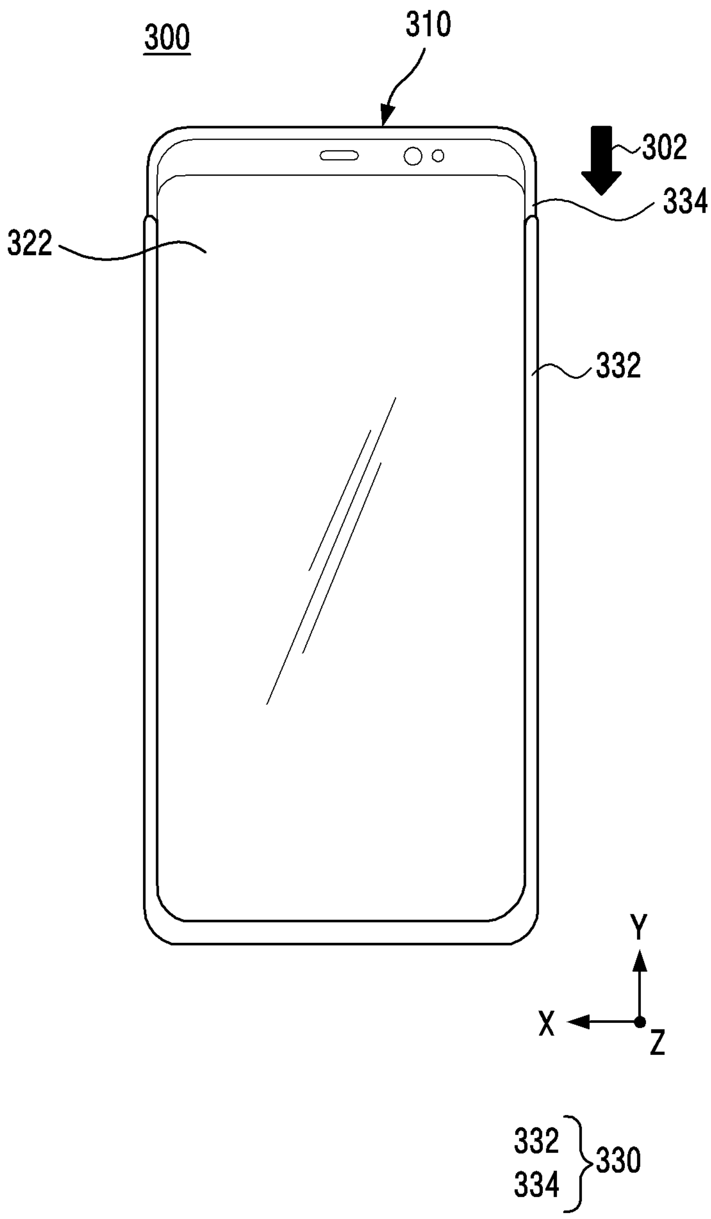
FIG. 3A is a plan view of an electronic device in a sliding-in state according to an embodiment of the disclosure.
Figure 3B:
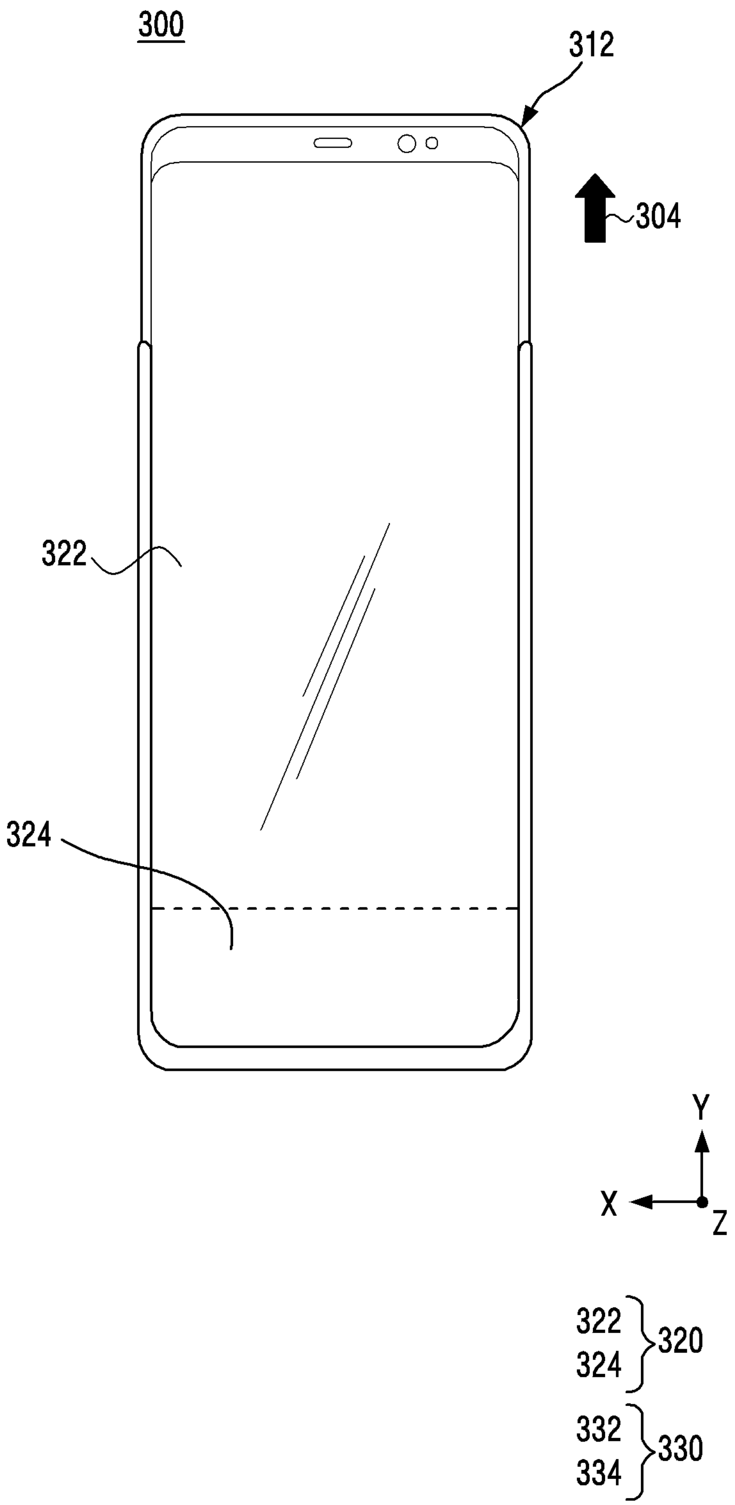
FIG. 3B is a plan view of an electronic device in a sliding-out state according to an embodiment of the disclosure.

For example, the electronic device 100 may have the same mechanical structure as the electronic device 200 in FIGS. 2A and 2B or the electronic device 300 in FIGS. 3A and 3B.

FIGS. 2A and 2B illustrate a mechanical structure of an electronic device according to an embodiment. FIGS. 3A and 3B illustrate a mechanical structure of an electronic device according to another embodiment. The structures shown in FIGS. 2A, 2B, 3A, and 3B are only for easy understanding, and the scope of the embodiments is not limited to the structures. Within the range that includes a display having a flexible structure (e.g., the display 120 in FIG. 1), various embodiments of modifying, changing, applying, and extending the structure are possible.

An electronic device according to various embodiments may be an electronic device including a display capable of being expanded/reduced in at least one direction. For example, an electronic device according to various embodiments may include at least one of a horizontally slidable-type electronic device, a vertically slidable-type electronic device, a multiple axially slidable-type electronic device capable of sliding in both directions (e.g., the horizontal or vertical direction) around multiple axes, and a rollable-type electronic device in which substantially the entirety of the display (e.g., 90% or more of the total area) is slid in one direction and rolled on a rotating body in a housing or is drawn out of the housing so as to be unfolded.

FIG. 2A is a front perspective view of an electronic device in a sliding-in state according to an embodiment of the disclosure.

FIG. 2B is a front perspective view of an electronic device in a sliding-out state according to an embodiment of the disclosure.

Referring to FIGS. 2A and 2B together, the electronic device 200 according to an embodiment may include a display 220 having a flexible structure and a housing 230. The display 220 may include a first area 222 and a second area 224. The housing 230 may include a first housing 232 and a second housing 234.

The display 220 may be disposed on the front surface of the electronic device 200. For example, the display 220 may occupy most of the front surface area of the electronic device 200. The housing 230 surrounding at least a part of an edge of the display 220 may be disposed on the front surface of the electronic device 200. For example, the housing 230 may form a partial area of the front surface, the side surface, and the rear surface of the electronic device 200. As another example, the housing 230 may form a partial area of the side surface and the rear surface of the electronic device 200.

The housing 230 may include a first housing 232 and a second housing 234. The second housing 234 may be coupled to the first housing 232 to be slidable with respect to the first housing 232. The second housing 234 may be slid in or slid out along the horizontal direction (expansion/reduction direction). For example, a driving source for sliding the second housing 234 may perform one of manual driving, automatic driving, or semi-automatic driving. When the sliding driving source is semi-automatic, a sliding guide member or a sliding driving body (e.g., motor) may be used, and when the sliding driving source is automatic, a roller-type guide member or a roller driving body (e.g., motor) may be used, but the sliding driving source is not necessarily limited to the sliding or the roller type.

When the electronic device 200 is switched from the sliding-in state 210 to the sliding-out state 212 according to the sliding operation of the second housing 234, the second area 224 of the display 220 may be drawn from the inside of the electronic device 200 to the outside. When the electronic device 200 is switched from the sliding-out state 212 to the sliding-in state 210 according to the sliding operation of the second housing 234, the second area 224 of the display 220 may be drawn into the electronic device 200.

The display 220 may include a first area 222 coupled to the second housing 234 and exposed to the outside of the electronic device 200, and a second area 224 extending from the first area 222 and insertable into the electronic device 200.

The display 220 may be coupled to the front surface of the second housing 234 and slide together with the second housing 234. Sliding of the second housing 234 may be understood as sliding of the display 220. The display 220 may be configured such that the size of the screen exposed to the front surface of the electronic device 200 is changed (e.g., expanded/reduced), based on the sliding operation of the second housing 234. When the second housing 234 is slid out along the first direction 202, the second area 224 of the display 220 may be drawn out of the electronic device 200 and thus have the expanded screen size of the display 220. When the second housing 234 is slid in in a direction 204 opposite to the first direction 202, the second area 224 of the display 220 may be drawn into the electronic device 200 and thus have the reduced screen size of the display 220. The display 220 may move by a predetermined distance along the first direction 202 by the sliding operation. The screen size of the display 220 exposed to the outside of the electronic device 200 may be changed (enlarged or reduced) by the sliding operation.

In the sliding-in state 210, the screen of the display 220 exposed to the front surface of the electronic device 200 may include the first area 222. In the sliding-out state 212, the screen of the display 220 exposed to the front surface of the electronic device 200 may include the first area 222 and the second area 224.

The display 220 may move by a predetermined distance (e.g., an expanded distance) along the first direction 202 by the sliding operation of the second housing 234 relative to the first housing 232. The screen size of the display 220 may be variable (expanded or reduced) in response to the sliding distance.

The electronic device 200 may detect a change in screen size of the display 220 through at least one sensor (e.g., the sensor module 140). For example, the electronic device 200 may detect a sliding distance of the display 220 through the at least one sensor and detect a change in screen size of the display 220, based on the detected sliding distance.

The electronic device 200 may obtain a sensing value according to the movement of the display 220. For example, the electronic device 200 may detect movement (e.g., rotation) of a rotating structure (e.g., a hinge, not shown) in the first housing 232 through the at least one sensor (e.g., the sensor module 140) and determine whether the second housing 234 is drawn into or drawn out from the first housing 232. For example, the electronic device 200 may detect sliding of the display 220 by using a distance sensor. The distance sensor may measure the distance of the second housing 234 relative to the first housing 232. The distance sensor may include at least one of a time of flight (TOF) sensor, an ultrasonic sensor, and a radio wave sensor. The electronic device 200 may detect a sliding distance of the second housing 234 relative to the first housing 232 through the distance sensor. As another example, the electronic device 200 may detect the sliding distance by using at least one sensor. The at least one sensor may be configured to generate distinguishable electrical signals for each state (e.g., a sliding-in state 210 and a sliding-out state 212) in which the degree of movement of the second housing 234 is different. The at least one sensor may include a Hall sensor and/or a magnet sensor. The electronic device 200 may detect the sliding distance through the at least one sensor. The electronic device 200 may detect a change in screen size of the display 220, based on a sensing value according to the movement of the display 220.

FIG. 3A is a plan view of an electronic device in a sliding-in state according to an embodiment of the disclosure.

FIG. 3B is a plan view of an electronic device in a sliding-out state according to an embodiment of the disclosure.

The electronic device 300 is a vertically slidable-type electronic device and may include a housing 330 and a display 320. The housing 330 may include a first housing 332 and a second housing 334. The display 320 may include a first area 322 and a second area 324.

The second housing 334 may be slid into the first housing 332 and be drawn into the first housing 332 along the first direction 302. The second housing 334 may be slid out from the first housing 332 and drawn out from the first housing 332 along the second direction 304. For example, the sliding driving source of the second housing 334 may be driven manually, automatically, or semi-automatically. For example, when the sliding driving source is semi-automatic, a sliding guide member or a sliding driving body may be used. When the sliding driving source is automatic, a roller-type guide member or a roller driving body may be used, but the sliding driving source is not necessarily limited to the sliding or the roller type.

The second housing 334 may be slid in or out of the first housing 332 by a guide member.

The second housing 334 may be slid in or slid out in a longitudinal direction (e.g., the Y-axis direction) of the first housing 332. The second housing 334 may include a display 320 having a flexible structure disposed on the front surface thereof.

The display 320 may be configured such that the size of the screen exposed to the front surface of the electronic device 300 is changed (e.g., expanded/reduced), based on the sliding operation of the second housing 334. The screen size of the display 320 exposed to the front surface of the electronic device 300 may be expanded according to the sliding-out operation. The screen size of the display 320 exposed to the front surface of the electronic device 300 may be reduced according to the sliding-in operation.

In the sliding-in state 310, the screen of the display 320 exposed to the front surface of the electronic device 300 may include the first area 322. In the sliding-out state 312, the screen of the display 320 exposed to the front surface of the electronic device 300 may include the first area 322 and the second area 324.

A part of the display 320 may be drawn into the first housing 332 or drawn out of the first housing 332 by the guide member. The display 320 may include the first area 322 that is always exposed, and the second area 324 that is selectively exposed according to a sliding operation. The second area 324 may be drawn into the electronic device 300 according to the sliding-in operation of the second housing 334 or be drawn out of the electronic device 300 according to the sliding-out operation of the second housing 334. The second area 324 may be a screen area expanded according to the sliding-out of the second housing 334.

Figure 4:
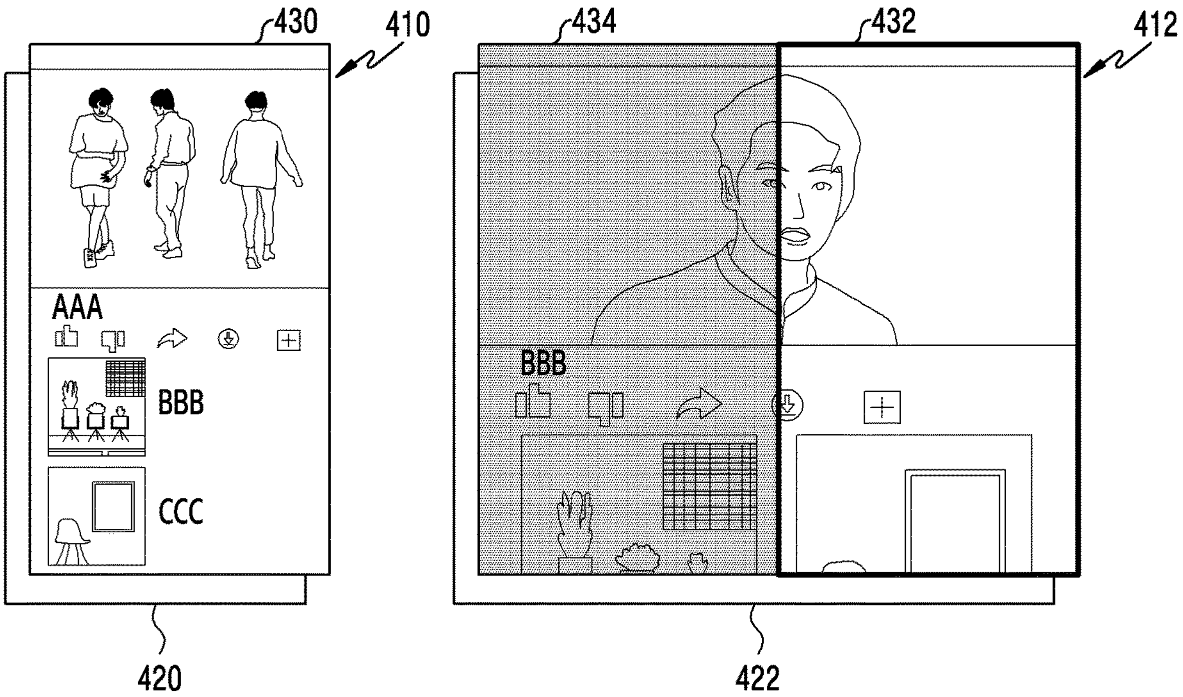
FIG. 4 is an example of a screen showing a recorded video of an electronic device according to an embodiment of the disclosure.

FIG. 4 is an example of a screen showing a recorded video of an electronic device according to an embodiment of the disclosure.

Referring to FIG. 4, reference numeral 410 denotes a first recorded video in a state (e.g., a basic state) before expansion. Reference numeral 420 denotes a first screen before expansion. Reference numeral 430 denotes a recording area of the first recorded video 410. The first recording area 430 may correspond to the first screen 420.

Reference numeral 412 denotes a second recorded video in a state (e.g., maximally expanded state) after expansion. Reference numeral 422 denotes a second screen after expansion. The second recorded video 412 may be a video in which the second screen 422 is recorded. Reference numeral 432 denotes a second recording area.

The size of the recording area 430 or 432 may be fixed to correspond to the size of the first screen 420. Since the size of the recording area 430 or 432 is fixed to correspond to the size of the first screen 420, a partial area 434 of the second screen 422 may not be recorded and may be cut off.

Accordingly, the size of the recording area 430 or 432 before/after expansion is fixed to one size even after the size of the screen 410 or 420 before/after expansion is changed, so that a part of the screen after expansion may not be recorded. Frames of the recorded videos 410 and 412 obtained through the recording areas 430 and 432 before/after expansion, respectively, may have the same format (e.g., constant width and height).

One video may have only one format. Since the width and height of frames (or images) in a video are fixed, the video may not have a flexible format. For example, the width and height of frames included in one video may be fixed to 768*2152. Variation of the width of the frames may not exceed range of 768 to 1536.

Since the size of the video is to be fixed to correspond to the size of one screen (e.g., 420) regardless of changes in screen size, when the screen size has been changed during screen recording (e.g., when switching from the screen before expansion 420 to the screen after expansion 422), a partial area (e.g., 434) of the screen may not be recorded. Since the recording area varies in consideration of the screen size change or the size of the recorded video does not change flexibly, the recording area may not be properly recognized or may be cut off.

Figure 5A:
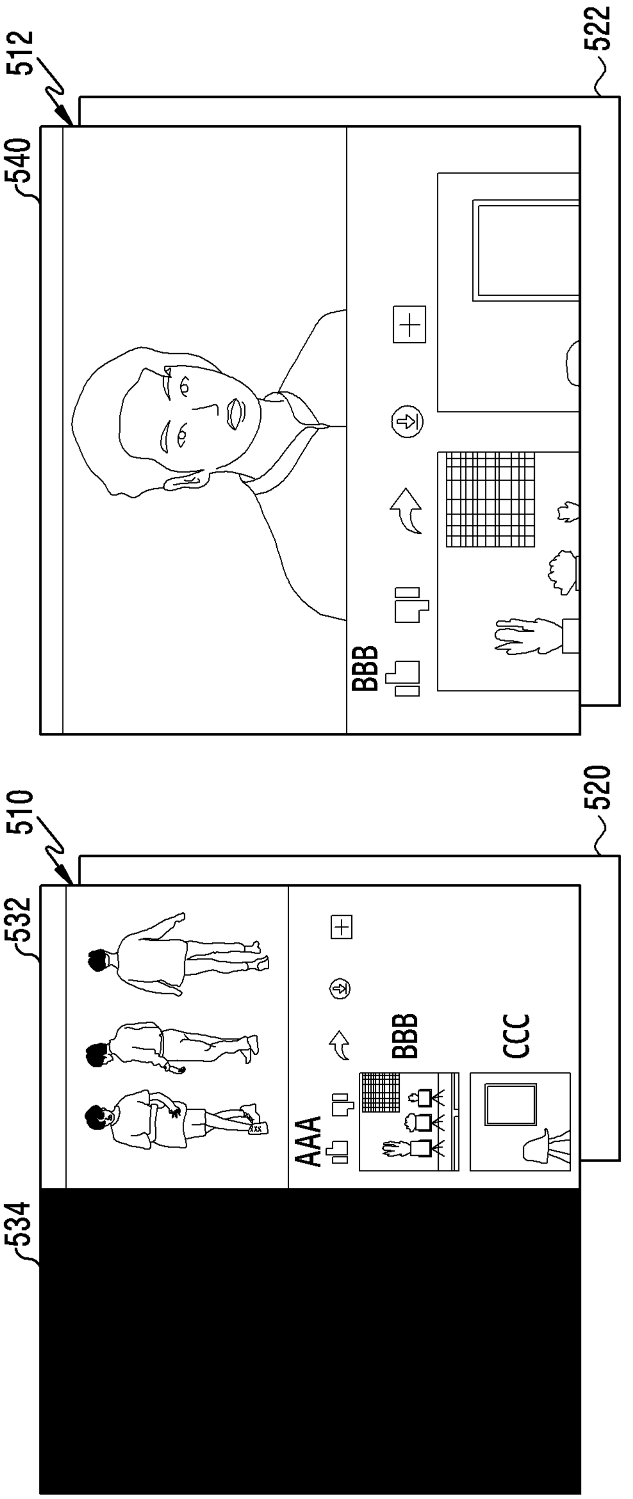
FIG. 5A is an example of a screen showing a recorded video of an electronic device according to an embodiment of the disclosure.

FIG. 5A is an example of a screen showing a recorded video of an electronic device according to an embodiment of the disclosure.

Referring to FIG. 5A, reference numeral 510 denotes a first recorded video (or a frame of the first recorded video) in a first state (e.g., a basic state) before expansion. Reference numeral 520 denotes a first screen in the first state. In the first state, the first screen 520 is an actual screen, and the size of the first screen 520 may be the actual screen size.

The first recorded video 510 may include an actual recording area 532 and a dummy area 534. The actual recording area 532 may be an area in which the first screen 520 is recorded. The size of the actual recording area 532 may correspond to (e.g., be the same as or proportional to) the size of the first screen 520.

The dummy area 534 may be a non-recording area added in consideration of changes in screen size.

Reference numeral 512 denotes a second recorded video (or a frame of the second recorded video) in a second state (e.g., a maximally expanded state) after expansion. Reference numeral 522 denotes a second screen in the second state. In the second state, the second screen 522 may be an actual screen, and the size of the second screen 522 may be the actual screen size. The size of the second screen 522 may be a maximum screen size according to the maximally expanded display 120.

The second recorded video 512 may include the actual recording area 540. The actual recording area 540 may be an area in which the second screen 522 is recorded. The size of the actual recording area 540 may correspond to (e.g., be the same as or proportional to) the size of the second screen 522.

The electronic device 100 may perform screen recording, based on the maximum screen size regardless of changes in the screen size (actual screen size) of the display 120. The maximum screen size is a screen size according to the maximally expanded display 120 and may be stored in advance.

In the first state, screen recording of the first screen 520 may be performed based on the maximum screen size regardless of the size of the first screen 520. When recording is performed based on the maximum screen size, a dummy area 534 may be added to the first recorded video 530 in consideration of the difference between the actual screen size and the maximum screen size. The dummy area 534 may be an area added in response to the difference between the maximum screen size and the size of the first screen 520, which is the actual screen. For example, the dummy area 534 may be processed as a blank video or blackened.

The first recorded video 530 in which the first screen 520 is recorded may include the actual recording area 532 in which the first screen 520, which is an actual screen, is recorded, and the dummy area 534 (e.g., a blanked or blackened area) according to the difference between the actual screen size and the maximum screen size.

When the actual screen size is decreased, the size of the dummy area 534 may be enlarged. When the actual screen size is increased, the size of the dummy area 534 may be reduced. When the actual screen size is expanded to the maximum screen size (e.g., a maximally expanded state), the dummy area may be unnecessary.

In the second state, the second screen 522 may be an actual screen, and the size of the second screen 522 may be the actual screen size. In the second state (e.g., a maximally expanded state), the size (actual screen size) of the second screen 522 may be the same as the maximum screen size. Screen recording of the second screen 522 may be performed based on the maximum screen size.

Since the actual screen size is the same as the maximum screen size in the second state, the video of the actual recording area 540 in which the second screen 522, which is the actual screen, is recorded may become the second recorded video 512. A dummy area (non-recording area) does not need to be added to the second recorded video 512.

Figure 5B:
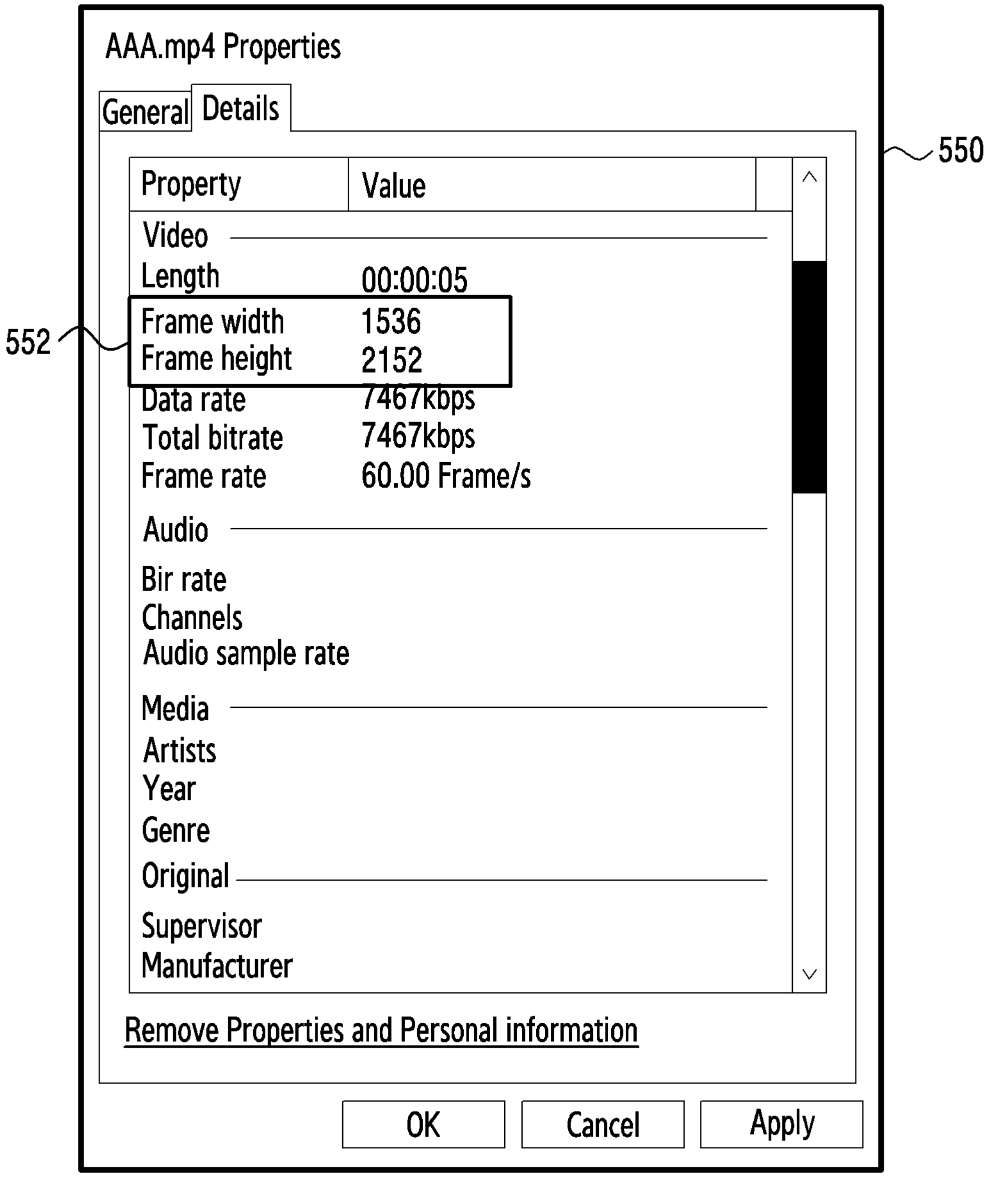
FIG. 5B is an example of a video format used in an electronic device according to an embodiment of the disclosure.

FIG. 5B is an example of a video format used in an electronic device according to an embodiment of the disclosure.

Reference numeral 550 denotes an example of a window showing the format (or attribute or standard) of a video file. Reference numeral 552 denotes an example of a frame width and frame height displayed on the window. Frames (or images) within a video may have a predetermined size (e.g., width and height).

When the screen of the display 120 is recorded based on one reference screen size (e.g., the maximum screen size), changes in the screen size of the display 120 may be covered using a single format (e.g., size-related attribute) corresponding to the reference screen size.

For example, the electronic device 100 may record the screen of the display 120, based on the maximum screen size of 1536*2152 regardless of the change in screen size of the display 120 to obtain frames (or images) of 1536*2152 size, thereby store the frames as one recorded video having a predetermined size.

Hereinafter, a screen control method by an electronic device according to various embodiments will be described with reference to FIGS. 6A, 6B, 7A to 7C, 8 to 10, 11A, 11B, and 12 to 17. A screen control method by an electronic device may include a method for recording a screen or a method for reproducing a video.

The screen control method illustrated in FIGS. 6A 6B, 7A to 7C, 8 to 10, 11A, 11B, and 12 to 17 may be performed by an electronic device (e.g., the electronic device 100 or the processor 110 in FIG. 1). For convenience, it is assumed that each operation is performed by the processor 110 in FIG. 1. The processor 110 may be configured to perform at least some of the operations of the screen control method according to an embodiment. In various embodiments, among the illustrated operations, at least one may be omitted therefrom, the order of some operations may be changed, or other operations may be added thereto.

Figure 6A:
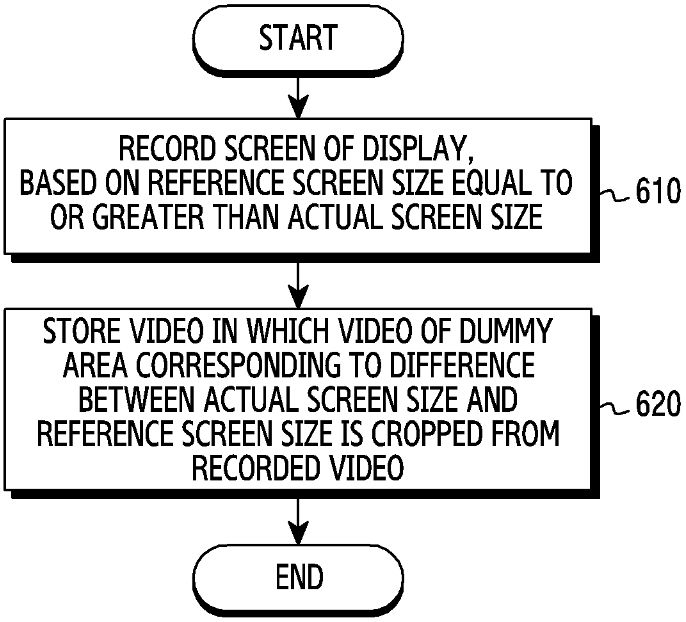
FIG. 6A is a flowchart illustrating a method for recording a screen by an electronic device according to an embodiment of the disclosure.

FIG. 6A is a flowchart illustrating a method for recording a screen by an electronic device according to an embodiment of the disclosure.

In operation 610, the processor 110 may record the screen of the display, based on a reference screen size (e.g., the maximum screen size) equal to or greater than the actual screen size.

For example, while screen recording is performed, changes in graphic elements (e.g., user interface (UI)/user experience (UX) elements or contents) displayed through the screen of a display may be recorded (or stored). For example, while the camera of the electronic device 100 is activated by the screen recording, a preview displayed through the screen of the display 120 may be recorded (or stored).

The reference screen size may be the maximum screen size according to the maximally expanded display 120.

In operation 620, the processor 110 may store, as an actual recorded video, a video in which a video of the dummy area corresponding to the difference between the actual screen size and the reference screen size is cropped from the video recorded in operation 610.

For example, the actual screen size may be determined based on a screen size changing while recording is performed. As another example, the actual screen size may be the maximum screen size while recording is performed.

Information on changes in screen size of the display 120 while recording is performed may be stored together with the recorded video.

In an embodiment, the processor 110 may detect, through at least one sensor in the sensor module 140, whether the screen size of the display 120 has been changed during recording. When the screen size of the display 120 has been changed, the processor 110 may record the screen of the display 120, based on the reference screen size.

While the screen size of the display 120 is fixed, the screen of the display 120 may be recorded based on the fixed screen size. The recorded video may be stored as a first video. When the screen size of the display 120 has been changed, the screen of the display 120 may be recorded based on the reference screen size. A second video in which the dummy area is cropped from the recorded video may be stored.

The first video and the second video may be stored as one video. For storage, the processor 110 may modify the size of at least one of the first video and the second video such that the first video and the second video have a predetermined format (e.g., size-related attribute). For example, a video having a smaller size between the first video and the second video may be modified and stored based on the reference video size. The reference video size may be any one of the size of a video corresponding to the reference screen size or the size of a video having a larger size between the first video and the second video.

In another embodiment, when a partial recording area is configured on the screen of the display 120, the processor 110 may obtain a video in which the dummy video is cropped and removed from the recorded video and the area other than the partial recording area is additionally cropped form the recorded video, and then store the video as an actual recorded video.

While the screen size of the display 120 is fixed, the screen of the display 120 may be recorded based on the fixed screen size. A first partial recorded video corresponding to the partial recording area in the recorded video may be stored. When the screen size of the display 120 has been changed, the screen of the display 120 may be recorded based on the standard screen size. A second partial recorded video corresponding to the partial recording area in the recorded video may be stored.

The first partial recorded video and the second partial recorded video may be stored as one video. For storage, the processor 110 may modify the size of at least one of the first partial recorded video and the second partial recorded video such that the first partial recorded video and the second partial recorded video have a predetermined format (e.g., size-related attribute).

When the processor 110 receives a request to reproduce the recorded video stored in operation 620, the processor 110 may reproduce and display the video on the display 120.

Figure 6B:
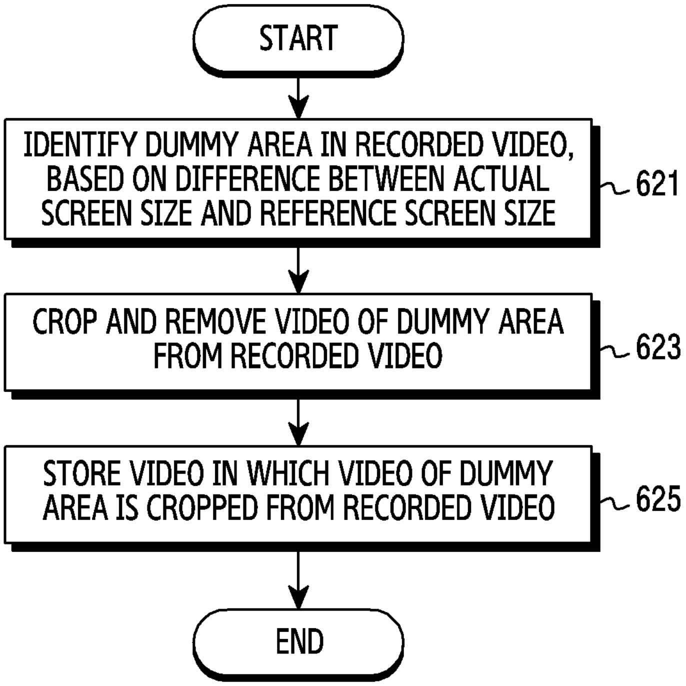
FIG. 6B is a flowchart illustrating a method for recording a screen by an electronic device according to an embodiment of the disclosure.

FIG. 6B is a flowchart illustrating a method for recording a screen by an electronic device according to an embodiment of the disclosure.

As an example, the operations of FIG. 6B may be detailed operations of operation 620.

In operation 621, the processor 110 may identify a dummy area in the recorded video, based on the difference between the actual screen size and the reference screen size.

In operation 623, the processor 110 may crop and remove the video of the dummy area from the recorded video.

In operation 625, the processor 110 may store, as an actual recorded video, the video in which the video of the dummy area is cropped from the recorded video.

Figure 7A:
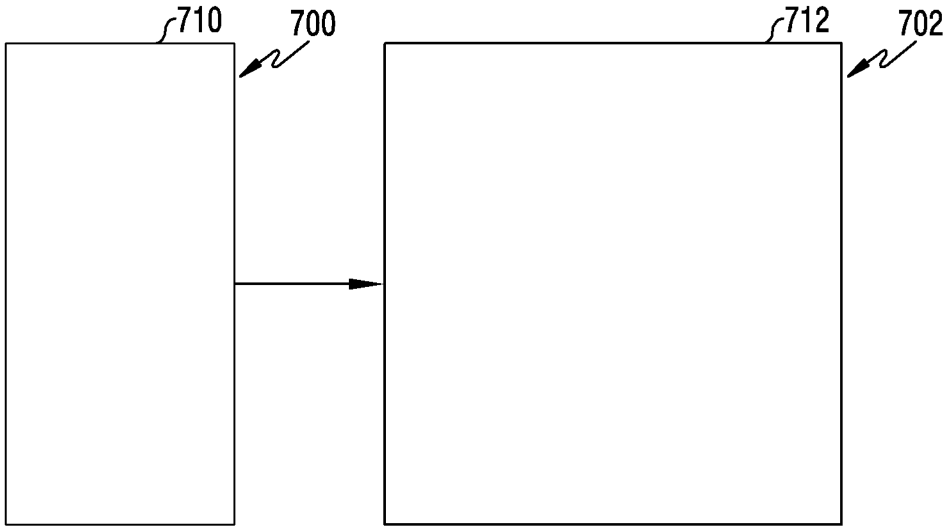
FIG. 7A illustrates changes in screen size of an electronic device according to an embodiment of the disclosure.

FIG. 7A illustrates changes in screen size of an electronic device according to an embodiment of the disclosure.

Reference numeral 700 denotes a first state expansion (e.g., a basic state, a minimally expanded state, and an expanding state) before expansion. Reference numeral 710 denotes a first screen of the first state 700. In the first state 700, the first screen 710 may be an actual screen, and the size of the first screen 710 may be the actual screen size.

Reference numeral 702 denotes a second state (e.g., a maximally expanded state) after expansion. The screen of the display 120 may be expanded to the maximum screen size. Reference numeral 712 denotes a second screen in the second state 702 in which the screen of the display 120 is expanded to the maximum screen size. In the second state 702, the second screen 712 may be an actual screen, and the size of the second screen 712 may be the actual screen size. The second screen 712 may have the maximum screen size.

When the electronic device 100 is in a low power state, a video recording method may be changed (or limited). For example, the processor 110 may identify a low power state of the electronic device 100. For example, cases in which a failure of a driving body (e.g., a motor) in the electronic device 100 is detected, the remaining battery level is equal to or less than a threshold value, or the screen of the electronic device 100 is not expandable or reduceable may be identified as a low power state. When a video is recorded in a low power state, the processor 110 may perform recording, based on the size of the screen (current screen) without change. When a screen reduction or expansion is attempted by a user, a notification window indicating that the screen reduction or expansion is not possible may be displayed. When the recording ends, a video recorded based on the recorded screen size without change may be stored.

Figure 7B:
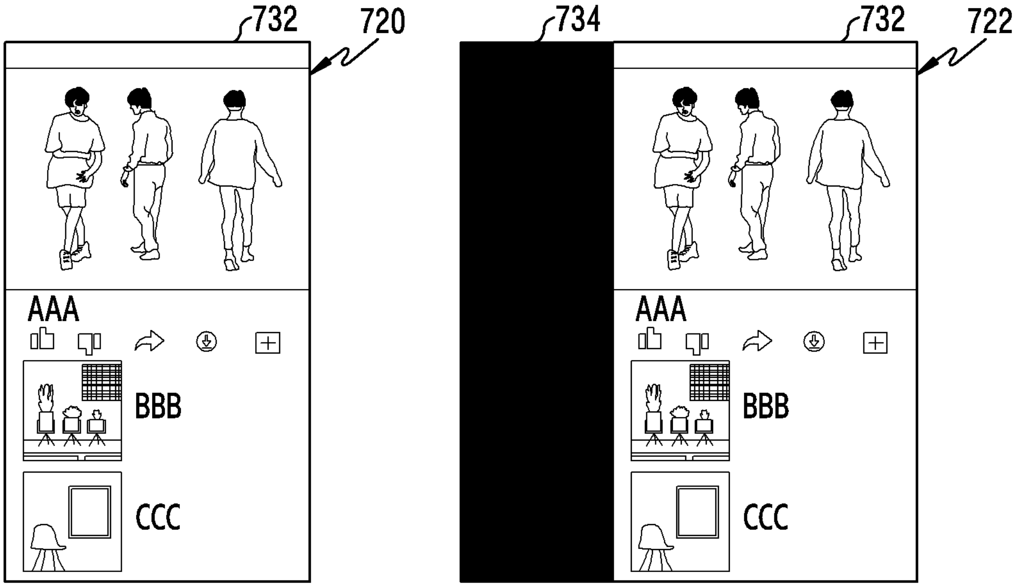
FIG. 7B illustrates a recorded video of an electronic device according to an embodiment of the disclosure.

FIG. 7B illustrates a recorded video of an electronic device according to an embodiment of the disclosure.

Reference numeral 720 denotes an actual recording area in the first state 700. The actual recording area 720 may be a video in which the first screen 710 is recorded. The size of the actual recording area 720 may correspond to the size of the first screen 710.

Reference numeral 722 denotes a first recorded video (or a frame of the first recorded video) in the first state 700. The first recorded video 722 may include an actual recording area 732 and a dummy area 734. The first recorded video 722 may include the actual recording area 732 and the dummy area 734 (e.g., a non-recording area, a blanked or blackened area).

When recording starts in the first state 700, the processor 110 may perform recording, based on the maximum screen size regardless of the size (actual screen size) of the first screen 710. The first recorded video 722 obtained by recording the first screen 710 may include the actual recording area 732 corresponding to the first screen 710. In addition, the first recorded video 722 may include the dummy area 734 corresponding to the difference between the maximum screen size and the actual screen size. The dummy area 734 may be an area added to enable screen recording to be performed using a video format (e.g., width and height of a fixed frame) corresponding to the maximum screen size.

Even after the screen size has changed, the processor 110 may record the screen, based on the maximum screen size regardless of the actual screen size or a change in the actual screen size. A video recorded based on the maximum screen size may include the actual recording area 732 and the dummy area 734. When recording is performed based on the maximum screen size, a part that does not correspond to the actual screen (a part having not been recorded) may be treated as the dummy area 734.

Since the first recorded video 722 (corresponding to the maximum screen) is formed by combining the video of the actual recording area 732 and the video of the dummy area 734, the size of the dummy area 734 may vary depending on the size of the actual recording area 732. The size of the actual recording area 732 (actual screen size) may be inversely proportional to the size of the dummy area 734. When the actual screen size is reduced, the size of the dummy area 734 may be enlarged. When the actual screen size is increased, the size of the dummy area 734 may be decreased. When the actual screen size is expanded to the maximum screen size (e.g., a maximally expanded state), the dummy area may be unnecessary.

Figure 7C:
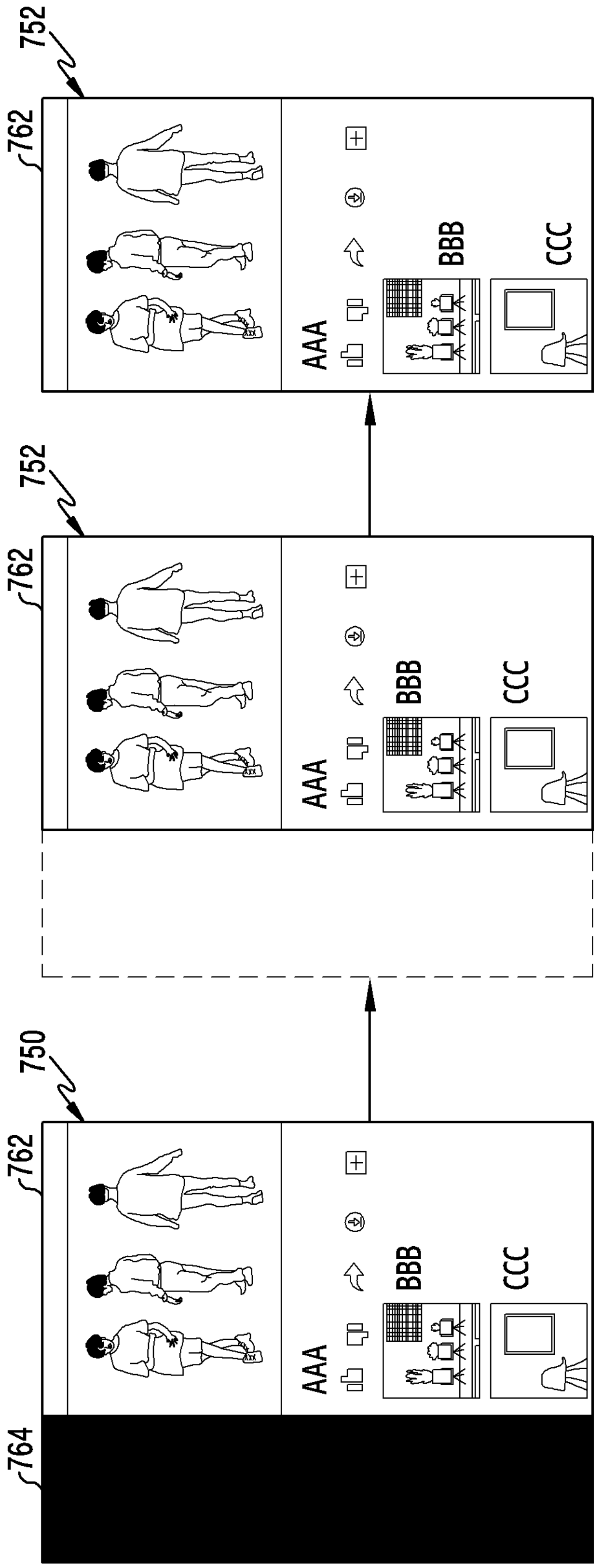
FIG. 7C illustrates a crop processing method for storing a recorded video by an electronic device according to an embodiment of the disclosure.

FIG. 7C illustrates a crop processing method for storing a recorded video by an electronic device according to an embodiment of the disclosure.

Referring to FIG. 7C, reference numeral 750 denotes a recorded video (or a frame of the recorded video) in the first state 700 before expansion. The recorded video 750 may be a video in which the first screen 710 of the electronic device 100 is recorded based on the maximum screen size. The size of the recorded video 750 may correspond to (e.g., equal to or proportional to) the maximum screen size. The recorded video 750 may include an actual recording area 762 in which the first screen 710 is recorded, and a dummy area 764 that is a non-recording area.

The remaining video 752 (a video of the actual recording area 762) after the dummy area 764 is cropped and removed from the recorded video 750 (or the frame of the recorded video 750) may be stored as an actual recorded video (or a frame of the actual recorded video).

An area of the maximally expandable screen area of the display 120 (e.g., the area of the second screen 712 in FIG. 7A), which has never been recorded because the actual screen is not expanded may be treated as a dummy area (e.g., 764). An area of the maximum screen area, which has been expanded at least once may be treated as an actual recording area (e.g., 762). The dummy area (e.g., 764) may be cropped based on the actual screen size when the screen is expanded. When the screen size is fixed while recording is performed, the fixed size may be the actual screen size. When the screen size has been changed during recording, the maximum screen size during recording may be the actual screen size. A video (e.g., 752) remaining after cropping may be stored as an actual recorded video (or a frame of the video).

Figure 8:
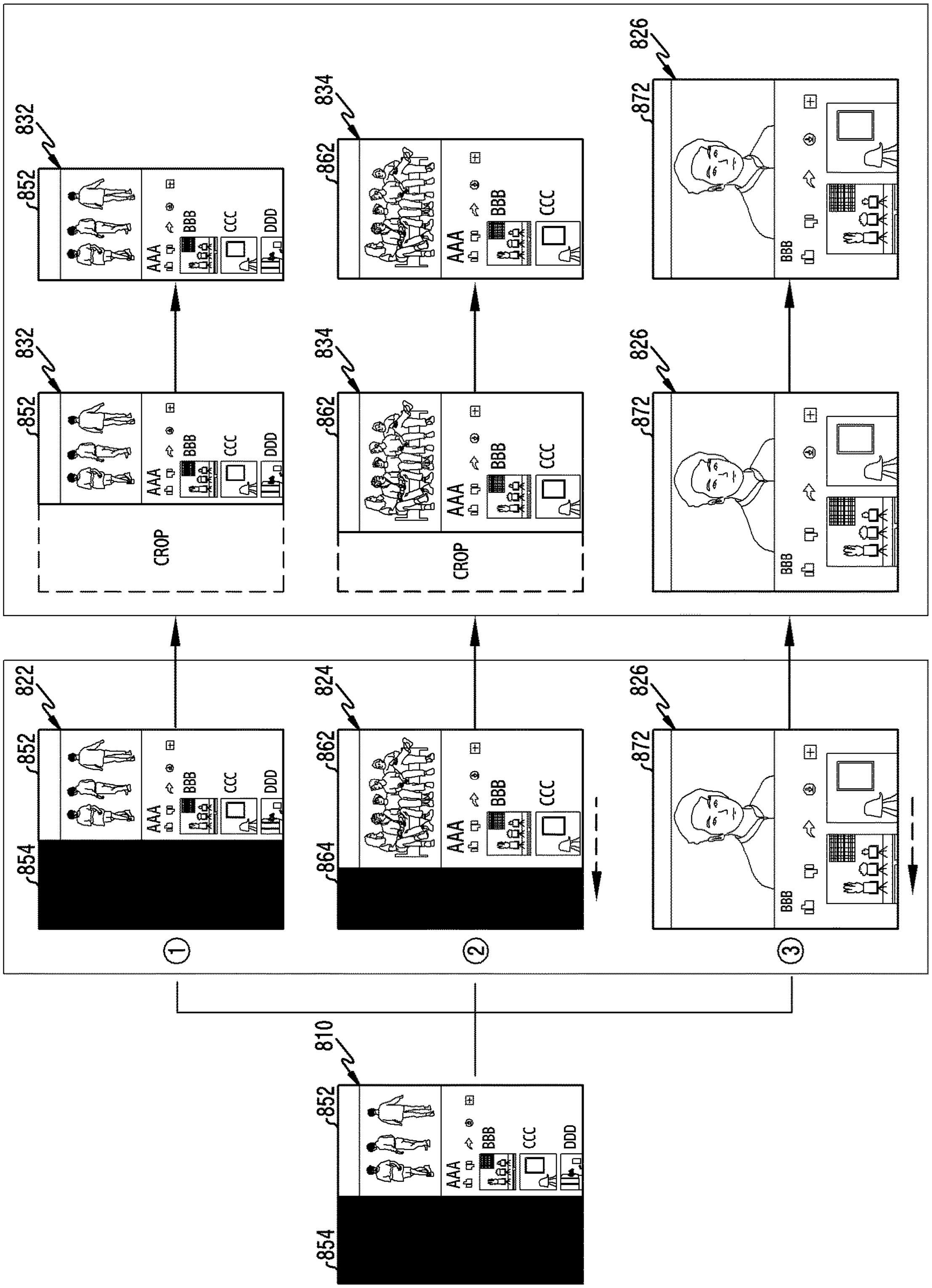
FIG. 8 is an example of a screen illustrating a method for recording a screen by an electronic device according to an embodiment of the disclosure.

FIG. 8 is an example of a screen illustrating a method for recording a screen by an electronic device according to an embodiment of the disclosure.

Referring to FIG. 8, reference numeral 810 denotes a recorded video (or a frame of the video) in a recording start state.

Reference numerals 822, 824 and 826 denote recorded videos (or frames of the videos) in a recording state.

The first recorded video 822 may be obtained by recording (or storing) a first screen. The first screen may have a basic screen size (or a minimum screen size). The second recorded video 824 may be obtained by recording (or storing) a second screen (e.g., an intermediate screen). The second screen may have an intermediate screen size. The third recorded video 826 may be obtained by recording (or storing) a third screen. The third screen may have the maximum screen size.

Reference numerals 832 and 834 denote first and second recorded videos after cropping the dummy areas 854 and 864, respectively. The third recorded video 826 may be obtained by recording the third screen having the maximum screen size, and thus a dummy area may not be added thereto. Crop processing of the third recorded video 826 may be omitted.

At least one of the first recorded video 832, the second recorded video 834, and the third recorded video 826 may be stored as an actual recorded video.

While recording is performed, the processor 110 may perform recording, based on the maximum screen size. Video recording may be performed based on the maximum screen size according to the maximally expanded display 120. Screen recording may be performed based on the maximum screen size regardless of the actual screen size. The extent of change (e.g., expanded or reduced) in screen size during use of the electronic device 100 may not be identified. By performing screen recording, based on the maximum screen size, screen recording may be performed regardless of changes in the screen size. In addition, all variable ranges of the screen size during screen recording may be covered.

Reference numeral 810 denotes a recorded video (or a frame of the video) in a recording start state. When recording starts, the screen size may be the first size. The first size may be the size of the actual recording area 852 (e.g., a basic screen or a minimally expanded screen) when recording starts.

In the recording start state (e.g., the basic state), the actual screen size may be the first size (e.g., the minimum screen size). Screen recording may be performed based on the maximum screen size regardless of the actual screen size. The recorded video 810 may include the actual recording area 852 and the dummy area 854.

Reference numerals 822, 824, and 826 denote recorded videos (or frames) according to changes in screen size during recording.

The screen size during recording may have a value between the minimum screen size and the maximum screen size. For example, the screen size during recording may be one of the first size, the second size, and the third size. The first actual recording area 852 (e.g., the basic screen, the minimally expanded screen) may have the first size (e.g., the basic screen size). The second actual recording area 862 (e.g., the screen being expanded) may have the second size (e.g., the intermediate screen size). The third actual recording area 872 (e.g., the maximum screen) may have the third size (e.g., the maximum screen size).

When screen recording is performed based on the maximum screen size regardless of the actual screen size, the sizes of the first recorded video 822, the second recorded video 824, and the third recorded video 826 may all be the same. A first dummy area 854 may be added to the first recorded video 822 in order to make the recorded videos have the same format (e.g., frame width and frame height of each video). A second dummy area 864 may be added to the second recorded video 824.

The first recorded video 822 may include the first actual recording area 852 and the first dummy area 854. A screen size (e.g., a basic screen size) in a recording start state may be maintained during recording without change.

The second recorded video 824 may include the second actual recording area 862 and the second dummy area 864. For example, the screen size may be changed in a stepwise manner (e.g., expansion/reduction, case in which the display 120 may be stopped in the middle of expansion/reduction) during recording. When the size (e.g., an intermediate screen size) of the actual recording area is expanded (e.g., 852→862), the size of the dummy area may be reduced (e.g., 854→864). When the size of the actual recording area is reduced (e.g., 862→852), the size of the dummy area may be expanded (e.g., 864→854).

The third recorded video 826 may include only the third actual recording area 872 without a dummy area. For example, the display 120 may be expanded to the maximum screen size with a single motion without stopping in the middle. As shown, when the actual screen size of the display 120 is expanded to the maximum screen size (or when the actual screen size is the same as the maximum screen size), the dummy area does not need to be added.

Reference numerals 832, 834 and 836 show cropping process in a state after recording (a recording completed state).

Video storage (or crop processing for storage) may be performed based on an actual screen size. The actual screen size may be understood as the maximum screen size during recording. For example, when the screen size (actual screen size) is fixed to a predetermined size without change (e.g., expansion/reduction) during recording, the fixed size may become the actual screen size. As another example, when the screen size is varied in multiple steps during recording, the screen size in the maximally expanded state during recording may become the actual screen size.

The processor 110 may store a video (actual recorded video) of the actual recording area 852 remaining after cropping 832 the dummy area 854 of the first recorded video 822. The video of the actual recording area 852 may be a video obtained by recording an actual screen having a first size. While recording is performed, when the screen size is fixed, a video 832 (actual recorded video) of the actual recording area 852 corresponding to the fixed size may be stored.

The processor 110 may store the video 844 of the actual recording area 862 remaining after cropping 834 the dummy area 864 of the second recorded video 824. When the screen size has been changed during recording, the actual screen size may be the maximum screen size while recording is performed (recording). The processor 110 may crop 834 and remove the dummy area 864, which is a non-recorded part, based on the state in which the screen is maximally expanded (actual screen size) during recording and then store a video 844 (actual recorded video) of the cropped actual recording area 862.

After the first recorded video 822 or the second recorded video 824 recorded based on the maximum screen size is cropped, the cropped video 832 or 834 may be stored. The cropped video 832 or 834 may include only the actual recording area 852 or 862 because the dummy area 854 or 864 added during recording are cropped and removed. After crop processing is performed based on the screen size (actual screen size) in a state where the actual screen is maximally expanded during recording, the cropped video 832 or 834 may be stored as an actual recorded video.

The processor 110 may store the video 846 of the actual recording area 872 in the third recorded video 826 as it is without cropping 836. When the display 120 is expanded to the maximum screen size even once during recording, a video (actual recorded video) corresponding to the maximum screen size may be stored. Since the third recorded video 826 is a recorded video in a state where the display 120 is expanded to the maximum screen size, the video 836 of the third actual recording area 872 may be stored as it is without cropping. The video 846 of the third actual recording area 872 may be stored as an actual recorded video.

For example, recorded videos 832, 834, and 826 according to various screen sizes may be combined and stored as a single file.

Recording may be performed based on the maximum screen size regardless of changes in the screen size (actual screen size) during recording. A dummy area considering the maximum screen size and the actual screen size is added during recording, and when storing a video, the added dummy area during recording may be cropped and then stored.

Accordingly, screen recording may be performed using the same format (e.g., width and height of a fixed frame) regardless of changes in screen size.

When storing a video, a video obtained after cropping the dummy area (e.g., 854, 864) added during recording is cropped from the recorded video (e.g., 822, 824, 826) may be stored. The stored video (e.g., at least one of 832, 834, and 836) may include only video (actual recorded video) of the actual recording area (e.g., 852, 862, 872).

When storing a video, information on the actual screen size may be stored together. For example, a screen size during recording or information on the screen size during recording may be included in metadata in video data.

Figure 9:
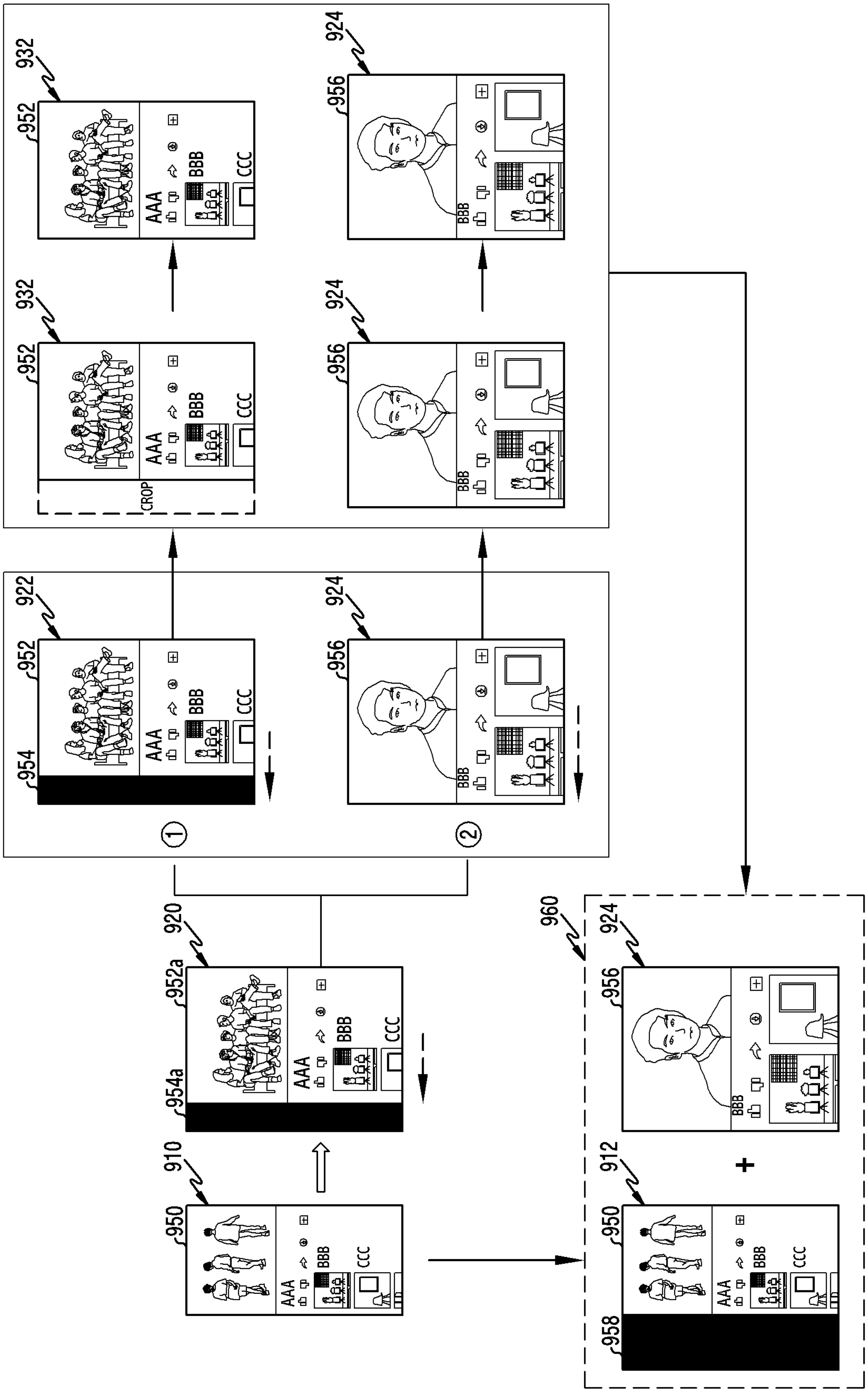
FIG. 9 is another example of a screen illustrating a method for recording a screen by an electronic device according to an embodiment of the disclosure.

FIG. 9 is another example of a screen illustrating a method for recording a screen by an electronic device according to an embodiment of the disclosure.

The processor 110 may perform screen recording, based on the actual screen size when the screen size is fixed, and when a change in screen size is detected, the processor 110 may perform screen recording, based on the reference screen size (e.g., the maximum screen size).

The processor 110 may detect, through at least one sensor (e.g., the sensor module 140), whether the screen size of the display 120 has been changed during recording. When the screen size of the display 120 has been changed, the processor 110 may record the screen of the display 120, based on the reference screen size (e.g., the maximum screen size).

The processor 110 may process two videos (e.g., the first type recorded video 910 and the second type recorded video 920) divided based on changes in screen size, and then combine the two videos (e.g., 912 and 924 or 912 and 932) with each other to store the combined videos as one video 960.

If screen recording is always performed based on the maximum screen size, resource (e.g., battery, storage capacity, load, processing speed) consumption may be high. Screen recording based on the maximum screen size may be selectively applied when screen size has been changed, to provide an adaptive screen recording function considering changes in screen size while saving resource.

Referring to FIG. 9, reference numeral 910 denotes a first type recorded video. The first type recorded video 910 may be a recorded video of a first screen (e.g., a screen in a basic state or a screen in a minimally expanded state) in a first state in which the screen size is fixed. The size of the first screen may be the actual screen size. The first type recorded video 910 may include an actual recording area 950.

Reference numeral 920 denotes a second type recorded video. The second type recorded video 920 may be a recorded video of a second screen (e.g., a screen being expanded) or a third screen (e.g., a screen in a maximally expanded state) in a second state in which the screen size has been changed. The second type recorded video 920 may include an actual recording area 952*a* and a dummy area 954*a*.

When the screen size is fixed, the processor 110 may perform recording, based on the fixed size (actual screen size). The first type recorded video 910 may be a video recorded based on the actual screen size. The first type recorded video 910 may include a first actual recording area 950 in which a first screen (e.g., a screen in a basic state or a screen in a minimally expanded state) is recorded. Since the first type recorded video 910 is recorded based on the actual screen size, a dummy area for compensating for the difference between the actual screen size and the maximum screen size may not be necessary.

When a change in screen size is detected, the processor 110 may perform recording, based on the maximum screen size regardless of changes in screen size or the changed screen size (actual screen size). The second type recorded video 920 may be a video recorded based on the maximum screen size. The second type recorded video 920 may include a second actual recording area 952 in which a second screen (e.g., a screen in an expanding state) is recorded. An area corresponding to the difference between the maximum screen size and the actual screen size may be treated as a dummy area 954.

Reference numerals 922 and 924 are examples of the second type recorded video 920. The second type recorded video 920 may be a first recorded video 922 or a second recorded video 924.

According to the change in screen size (actual screen size) during recording, the size of the actual recording area 952 and the size of the dummy area 954 may vary.

For example, the first recorded video 922 may be a video recorded when the screen is expanded to an intermediate size (actual screen size) during recording. The first recorded video 922 may include an actual recording area 952 corresponding to the intermediate size (actual screen size) and a dummy area 954 corresponding to the difference between the actual screen size and the maximum screen size.

As another example, the second recorded video 924 may be a video recorded when the screen is expanded to the maximum screen size during recording. In this case, since the actual screen size and the maximum screen size are the same, a dummy area does not need to be added. The second recorded video 924 may include only the actual recording area 956.

The first recorded video 922 may be a recorded video of a second screen (e.g., the screen being expanded). The first recorded video 922 may include a dummy area 954 and an actual recording area 952 corresponding to the second screen. After recording is completed, the dummy area 954 may be cropped from the first recorded video 922 so that only the actual recording area 952 remains. Reference numeral 932 denotes a first recorded video after cropping.

The second recorded video 924 may be a recorded video of a third screen (e.g., a screen in a fully expanded state). The second recorded video 924 may include an actual recording area 956 corresponding to the third screen. A dummy area does not need to be added to the second recorded video 924. When the dummy area is not added, the cropping process may be omitted. A video of the actual recording area 956 may be stored as it is without cropping.

To combine the two types of recorded videos 910 and 920 and store the combined videos as one video, the format (e.g., size-related attribute) of the video 910 may be modified based on the video 920 having a larger size between the two types of recorded videos 910 and 920. During the editing process, a dummy area 958 (an area to be blanked or blackened) may be added to the smaller-sized video 910 so that the two types of recorded videos 910 and 920 have the same video format.

To fit the video format, the video format of the first type recorded video 910 may be modified and a dummy area 958 may be added to the first type recorded video 910. Reference numeral 912 denotes a first type recorded video in a modified state. The first type recorded video 912 in a modified state may include an actual recording area 950 and the dummy area 958 modified according to a video format corresponding to the maximum screen size.

The second type recorded video 920 may be cropped and stored or may be stored as it has been recorded. For example, the first recorded video 922 may be stored as a cropped video 932. The second recorded video 924 may be stored as it has been recorded.

To combine the two types of recorded videos 910 and 920 and store the combined videos as one video, the video format may also be modified based on the maximum screen size.

In this case, the two types of recorded videos 910 and 920 may be processed according to one video format corresponding to the maximum screen size, and then combined to be stored as one video 960. For example, a first type recorded video 912 having a modified format (or having a dummy area 958 added thereto) and a second type recorded video (e.g., 924) having been cropped or remaining as recorded may be stored as one video file.

Figure 10:
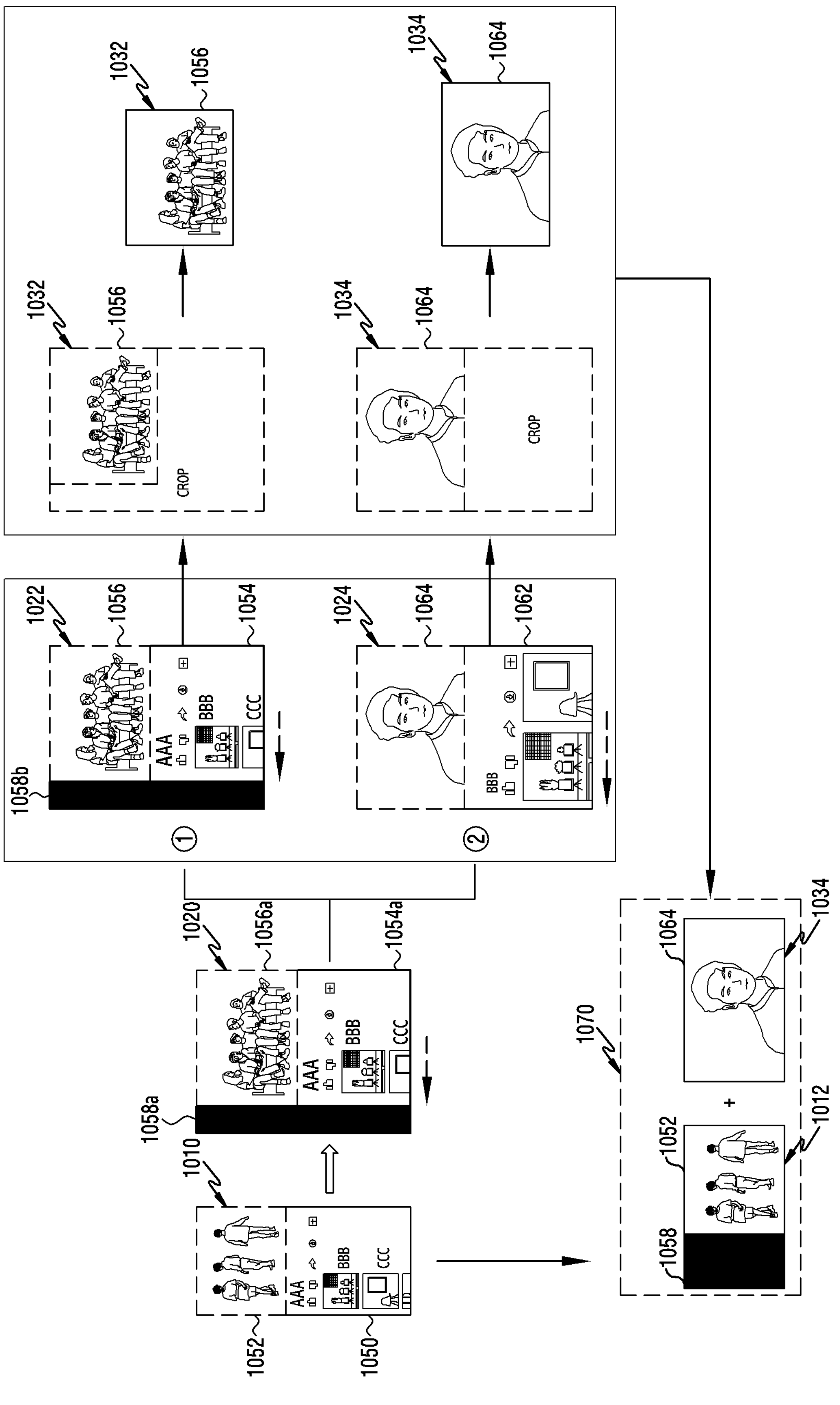
FIG. 10 is still another example of a screen illustrating a method for recording a screen by an electronic device according to an embodiment of the disclosure.

FIG. 10 is another example of a screen showing a method for recording a screen by an electronic device according to an embodiment of the disclosure.

When the example of FIG. 9 is a method of recording the entire screen, the example of FIG. 10 may be a partial recording method.

Referring to FIG. 10, reference numeral 1010 denotes a first type recorded video. The first type recorded video 1010 may be a video obtained by recording a first screen in a first state in which the screen size is fixed (e.g., a basic state or a minimally expanded state). A partial recording area 1052 may be configured on the first screen. Reference numeral 1050 denotes an area other than the partial recording area 1052.

A first type partial recorded video 1012 may be obtained from the first type recorded video 1010. The first type partial recorded video 1012 may include a partial recording area 1052, which is an actual recording area, and a dummy area 1058 which is a non-recording area.

Reference numeral 1020 denotes a second type recorded video. The second type recorded video 1020 may be a recorded video of a second screen in a second state (e.g., an expanding state or a maximally expanded state) in which the screen size has been changed. The second type recorded video 1020 may include a partial recording area **1056*a*, which is an actual recording area, and a remaining area 1054*a*. The second type recorded video 1020 may include a dummy area 1058*a***.

A second type partial recorded video 1032 or 1034 may be obtained from the second type recorded video 1020. The second type partial recorded video 1032 or 1034 may include a partial recording area 1056 or 1064 which is an actual recording area.

According to the movement (e.g., sliding) of the display 120, the first screen may be changed to the second screen, and the screen size may be thus changed. The size of the partial recording area 1052 may also be changed according to the changed screen size. Reference numeral 1056 denotes a partial recording area in an expanded state in response to the expanded screen size. Reference numeral 1054 denotes the remaining area in an expanded state in response to the expanded screen size.

The size of the partial recording area 1052 may be changed (e.g., expanded or reduced) in response to a change in screen size. The processor 110 may recognize the change in the partial recording area 1052 and display the changed partial recording area 1056 on the screen. For example, an indicator (e.g., a box mark or a graphic element, such as user interface (UI)/user experience (UE)) indicating the partial recording area 1056 may be displayed on the screen. For example, the processor 110 may record the entire screen while having information on the changed partial recording area 1056 for later crop processing.

When the screen size is fixed, the processor 110 may perform recording, based on the fixed size (actual screen size). The first type recorded video 1010 may be a video recorded based on the size of the first screen, which is the actual screen size. The first type recorded video 1010 may include a partial recording area 1052, which is an actual recording area, and a remaining area 1050.

Since the first type recorded video 1010 is recorded based on the actual screen size, a dummy area for compensating for the difference between the actual screen size and the maximum screen size may not be necessary.

When a change in screen size is detected, the processor 110 may perform recording, based on the maximum screen size regardless of the change in screen size or the changed screen size (actual screen size). The second type recorded video 1020 may be a video recorded based on the maximum screen size. The second type recorded video 1020 may include actual recording areas 1054 and 1056 in which the second screen (e.g., the screen in an expanding state) is recorded. An area corresponding to the difference between the maximum screen size and the actual screen size may be treated as a dummy area **1058*b***.

Reference numerals 1022 and 1024 are examples of the second type recorded video 1020. The second type recorded video 1020 may be a first recorded video 1022 or a second recorded video 1024.

The first recorded video 1022 may be a recorded video of a second screen (e.g., a screen being expanded). The first recorded video 1022 may include actual recording areas 1054 and 1056 and a dummy area **1058*b*. The actual recording areas 1054 and 1056 may include the partial recording area 1056 and the remaining area 1054. After completion of recording, the dummy area 1058*b* and the remaining area 1054 of the first recorded video 1022 may be cropped so that only the partial recording area 1056 remains. Reference numeral 1032** denotes a first recorded video after cropping.

The second recorded video 1024 may be a recorded video of a third screen (e.g., a screen in a maximally expanded state). The second recorded video 1024 may include actual recording areas 1062 and 1064 corresponding to the third screen. The actual recording areas 1062 and 1064 may include the partial recording area 1064 and the remaining area 1062. A dummy area does not need to be added to the second recorded video 1024. When the dummy area is not added, the cropping process on the dummy area may be omitted, and the cropping process may be performed on the remaining area 1062. After cropping, only the partial recording area 1064 may remain. Reference numeral 1034 denotes a second recorded video after cropping.

To combine the two types of partial recorded videos (e.g., 1012 and 1034, or 1012 and 1032) and store the combined videos as one video, at least one video format (e.g., size-related attribute) may be modified.

For example, the format (e.g., size-related attribute) of the video 1012 may be modified based on the video 1032 or 1034 having a larger size between the first type partial recorded video 1012 and the second type partial recorded video 1032 or 1034. During the editing process, a dummy area 1058 (an area to be blanked or blackened) may be added to the smaller-sized video 1012 so that the two types of partial recorded videos (e.g., 1012 and 1034, or 1012 and 1032) have the same video format.

As another example, one or more video formats of the partial recorded videos 1012, 1032, and 1034 may be modified based on the maximum screen size.

To fit one video format, the video format of the first type partial recorded video 1012 may be modified and the dummy area 1058 may be thus added to the first type partial recorded video 1012. Reference numeral 1012 denotes a first type partial recorded video in a modified state. The first type partial recorded video 1012 in a modified state may include a partial recording area 1052, which is an actual recording area, and the dummy area 1058 modified to fit a predetermined video format (e.g., fixed width and height).

The second-type partial recorded video 1032 or 1034 may be cropped and stored. For example, in the case of the first-type partial recorded video 1032, a video 1032 in the partial recording area 1056 remaining after cropping the dummy area **1058*b* and the remaining area 1054 may be stored. In the case of the second type partial recorded video 1034, a video 1034 in the partial recording area 1064 remaining after cropping the remaining area 1062** may be stored.

Two types of partial recorded videos (e.g., 1012 and 1034 or 1012 and 1032) may be processed to fit one video format (e.g., predetermined width and height) and then combined and stored as one video 1070. For example, a first type partial recorded video 1012 having a modified format (or having a dummy area 1058 added thereto) and a cropped second type partial recorded video (e.g., 1034) may be stored as one video 1070.

Figure 11A:
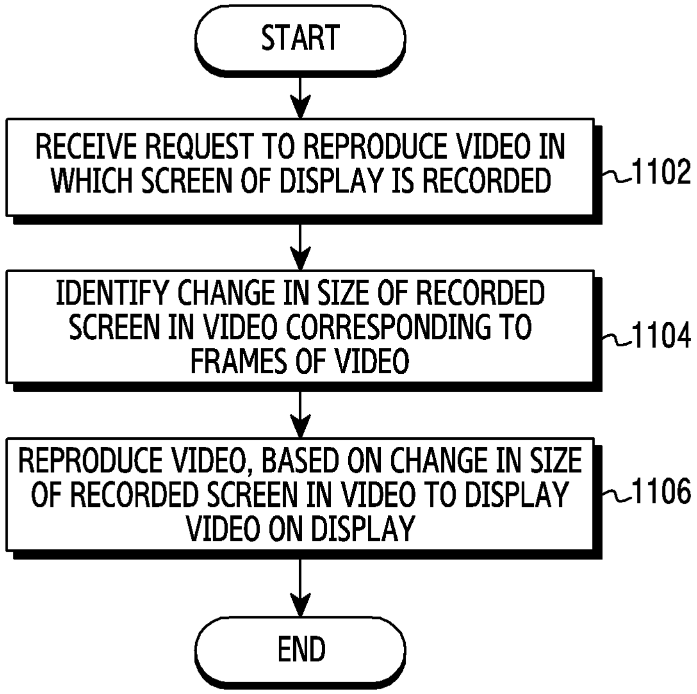
FIG. 11A is a flowchart illustrating a method for reproducing a video by an electronic device according to an embodiment of the disclosure.

FIG. 11A is a flowchart illustrating a method for reproducing a video by an electronic device according to an embodiment of the disclosure.

A method for reproducing a video by an electronic device according to an embodiment may include operations 1102 and 1104.

In operation 1102, the processor 110 may receive a request to reproduce a video in which the screen of the display 120 is recorded.

In operation 1104, the processor 110 may identify changes in size of recording areas in the video corresponding to frames of the video.

In operation 1106, the processor 110 may reproduce the video, based on the change in size of the recording areas in the video to display the video on the display 120.

When the sizes of the recording areas in the video are fixed, the size of the video may be the same as the fixed sizes. The processor 110 may display the video, based on a comparison between the screen size (current screen size) of the display 120 and the size of the video.

For example, the video may be displayed to correspond to the screen size of the display 120 while the screen size of the display 120 is fixed. As another example, the screen size of the display 120 may be changed in response to the size of the video.

The processor 110 may detect a change in screen size of the display 120 through at least one sensor (e.g., the sensor module 140) while the video is reproduced. The processor 110 may reproduce and display the video, based on the changed screen size of the display 120 and the size of the video.

When sizes of the recording areas in the video have been changed, the size of the video may be the same as the maximum size among the sizes of the recording areas. The video may be displayed based on a comparison between the screen size (current screen size) of the display 120 and the size of the video. When the current screen size of the display 120 is the same as the size of the video, the video may be displayed while maintaining the current screen size and the size of the video. When the screen size of the display 120 is different from the size of the video, the center of the video may be displayed in the middle of the screen of the display 120, or the video may be scaled and displayed to correspond to the screen size of the display 120. The scaling process may be performed while maintaining the aspect ratio of the video.

When sizes of the recording areas in the video have been changed, the processor 110 may change the screen size of the display 120 to correspond to the change in size of the recording areas. The processor 110 may display the video through the resized screen.

Figure 11B:
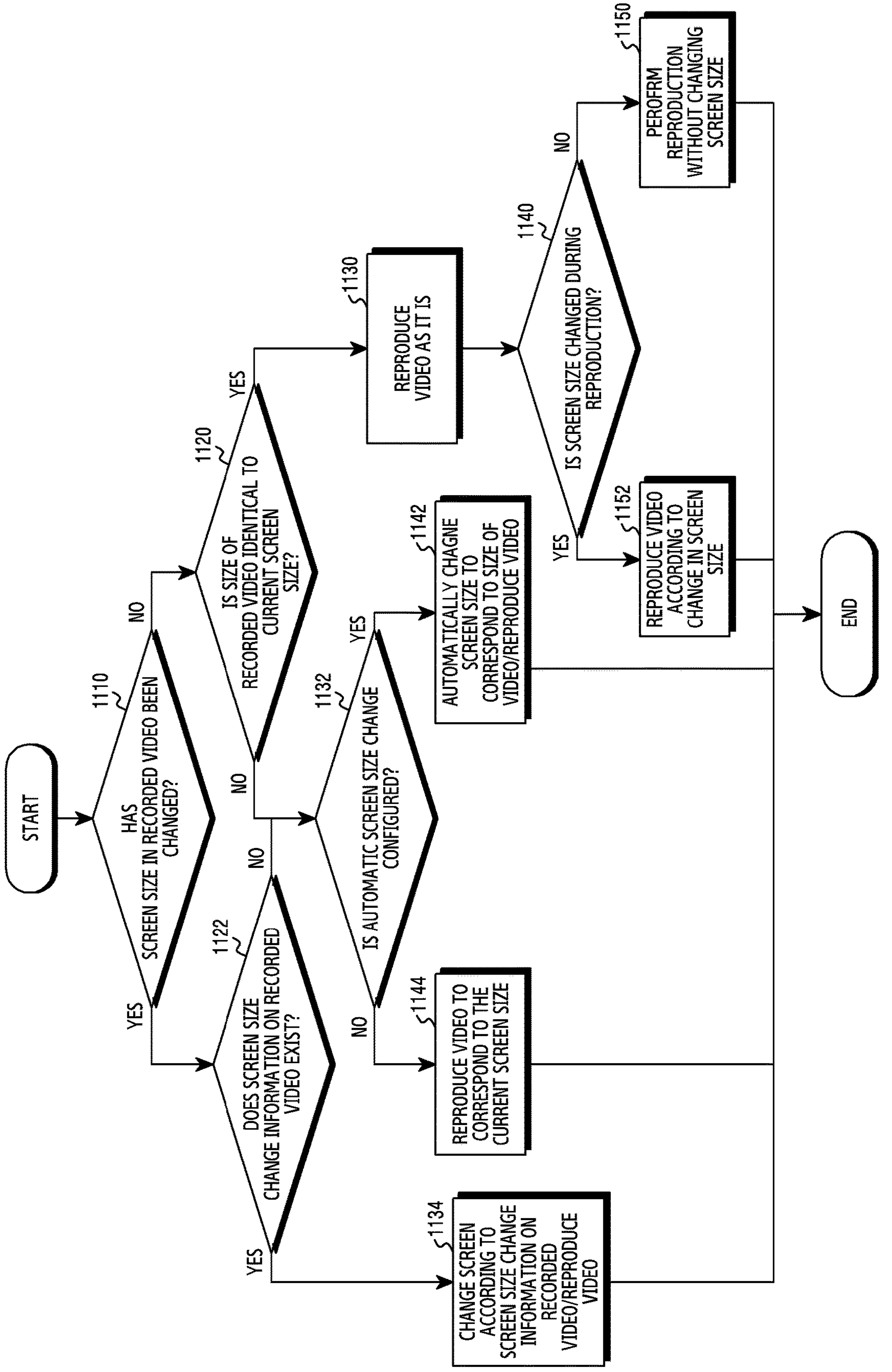
FIG. 11B is a flowchart illustrating a method for reproducing a video by an electronic device according to an embodiment of the disclosure.

FIG. 11B is a flowchart illustrating a method for reproducing a video by an electronic device according to an embodiment of the disclosure.

A request to reproduce a video in which the screen of the display 120 is recorded may be received.

In operation 1110, the processor 110 may determine whether the sizes of the recording areas in the video corresponding to frames of the video have been changed. Each of the frames may be obtained by recording the screen of the display 120 having a specific size. For example, the frames may be the stored recording areas of the same size. As another example, the frames may be the stored recording areas of different sizes. The frames may be processed to be a predetermined size (reference video size) and stored as one video (recorded video).

When the sizes of the recording areas in a video are fixed, the size of the video may be the same as the fixed sizes. When sizes of the recording areas in a video have been changed, the size of the video may be the same as the maximum size among the sizes of the recording areas.

When the sizes of the recording areas in the video have not been changed, the processor 110 may proceed to operation 1120 to determine whether the size of the video is the same as the current screen size of the display 120.

When sizes of the recording areas in the video have been changed, in operation 1122, the processor 110 may identify whether screen size change information on the video is stored. For example, when the video is stored (recorded), screen size change information on the video may be stored together with the video. For example, the processor 110 may identify whether screen size change information is included in metadata of the video. As another example, the processor 110 may identify whether screen size change information stored after being mapped to the video exists.

When the size of the video is the same as the current screen size of the display 120, in operation 1130, the processor 110 may reproduce the video while maintaining the current screen size of the display 120 and display the video on the display 120.

When the screen size change information on the video is not stored, in operation 1132, the processor 110 may identify whether automatic screen size change is configured.

When the screen size change information on the video is stored, in operation 1134, the processor 110 may reproduce (or display) the video while changing the screen size of the display 120 according to the screen size change information on the video. The screen size may be changed according to the size of each recording area in the video. For example, when the recording areas in a video have a first size, a second size, and a third size the processor 110 may display frames of the video on the display 120 while changing the screen size of the display 120 to the first size, the second size, and the third size to correspond to the screen size change history of the recording areas.

The processor 110 may display a message asking whether to approve changes in screen size of the display 120 before performing operation 1134 of changing the screen size of the display 120. When the changes in screen size is approved by a user in response to the message, the screen size of the display 120 may be changed.

In operation 1140, the processor 110 may determine whether screen size of the display 120 has been changed during reproducing of the video.

When automatic screen size change is configured, in operation 1142, the processor 110 may change the screen size to correspond to the size of the video and reproduce (or display) the video through the resized screen. The screen size of the processor 110 may be automatically varied (expanded or reduced) to correspond to the size of the video.

When the automatic screen size change is not configured, in operation 1144, the processor 110 may reproduce and display the video to correspond to the current screen size of the display 120. For example, the processor 110 may scale (expand or reduce) the video to correspond to the current screen size, and then display the scaled video in the middle of the screen through a center alignment operation. The scaling process may be performed in a state in which the aspect ratio of the video is maintained. The edge of the screen on which the scaled video is not displayed may be treated as a dummy area (e.g., blanked or blackened).

When screen size of the display 120 has not been changed during reproducing of the video, in operation 1150, the processor 110 may continuously reproduce or display the video while maintaining the current screen size of the display 120 without changing the screen size.

When screen size of the display 120 has been changed during reproducing of the video, in operation 1152, the processor 110 may reproduce (or display) the video according to the change in screen size of the display 120. For example, the processor 110 may scale (up or down scale, expanding or reducing) the video to correspond to the changed screen size, and then display the scaled video in the middle of the screen through a center alignment operation. The edge of the screen on which the scaled video is not displayed may be processed as a dummy area (e.g., blanked or blackened).

When the electronic device 100 is in a low power state, a video reproduction method may be changed (or limited). For example, when reproducing a video in a low power state, the processor 110 may collectively fit the video to the current screen size regardless of the size of the video being reproduced to reproduce and display the video. The video may be scaled and displayed according to the current screen size. The scaling process may be performed in a state in which the aspect ratio of the video is maintained.

Figure 12:
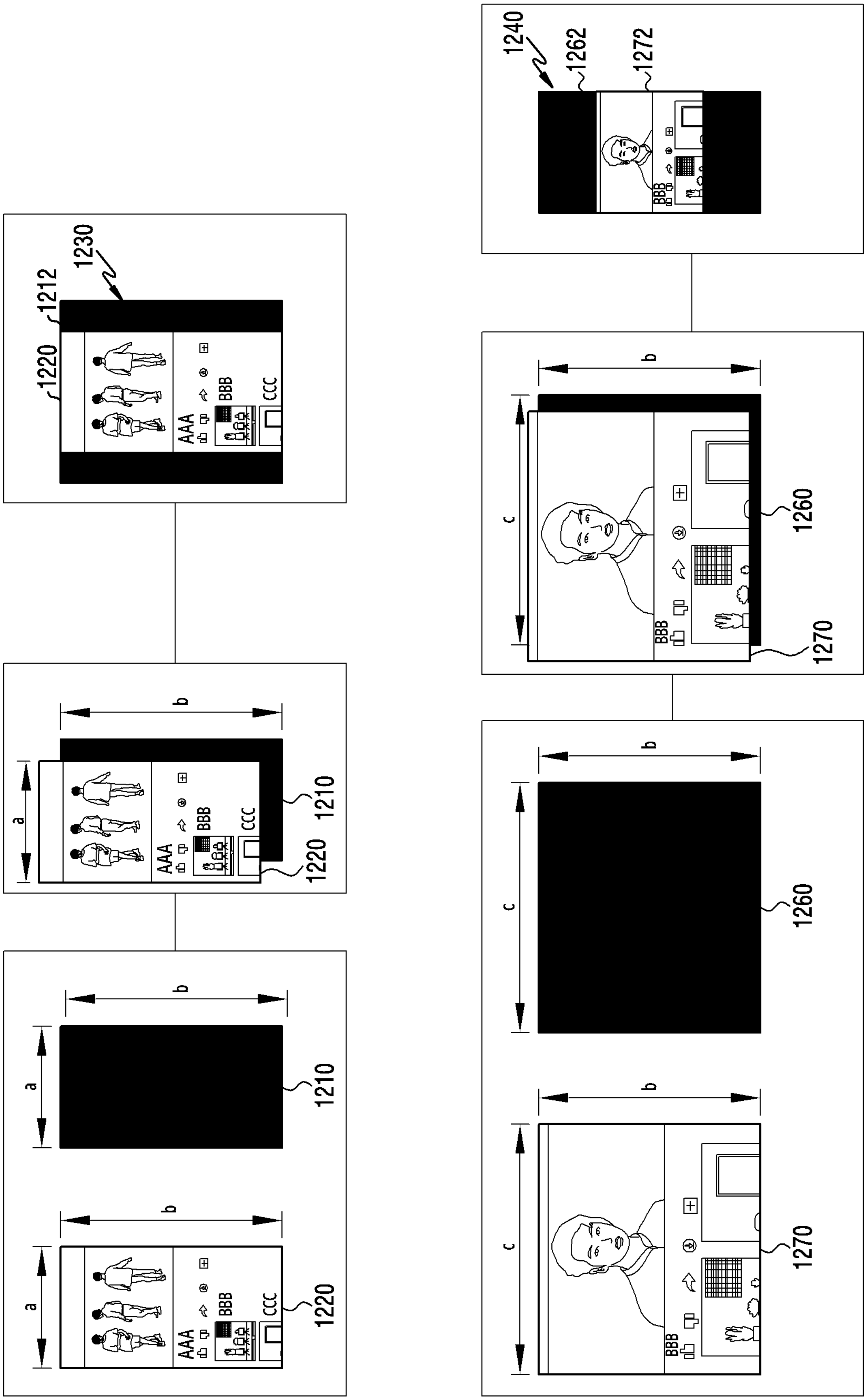
FIG. 12 is an example of a screen illustrating a method for reproducing a video by an electronic device according to an embodiment of the disclosure.

FIG. 12 is an example of a screen illustrating a method for reproducing a video by an electronic device according to an embodiment of the disclosure.

Referring to FIG. 12, a case in which screen size has not been changed during recording and the screen size of the display 120 is the same as the size of a video during reproduction.

Reference numeral 1210 denotes a first screen of the display 120. Reference numeral 1220 denotes a first recorded video. The size (width a*height b) of the first recorded video 1220 may be the same as the size (width a*height b) of the first screen 1210. When reproduction starts, the first recorded video 1220 can be displayed on the first screen 1210 having the same size.

Reference numeral 1260 denotes a second screen of the display 120. Reference numeral 1270 denotes a second recorded video. The size (width c*height b) of the second recorded video 1270 may be the same as the size (width c*height b) of the second screen 1260. When reproduction starts, the second recorded video 1270 may be displayed on the second screen 1260 having the same size.

The screen size of the display 120 may be changed (expanded or reduced) in the middle of reproduction. Reference numeral 1212 denotes an expanded first screen. Reference numeral 1262 denotes a reduced second screen.

When the size of the expanded first screen 1212 is larger than the size of the first recorded video 1220, as shown by reference numeral 1230, the first recorded video 1220 may be aligned in the center and be displayed in the middle of the expanded first screen 1212.

When the size of the reduced second screen 1262 is larger than the size of the second recorded video 1270, the second recorded video 1270 may be scaled (down-scaled) to correspond to the size of the reduced second screen 1262. The scaling process may be performed in a state in which the aspect ratio of the video is maintained. As shown by reference numeral 1240, the scaled second recorded video 1272 may be displayed on a reduced second screen 1262.

Figure 13:
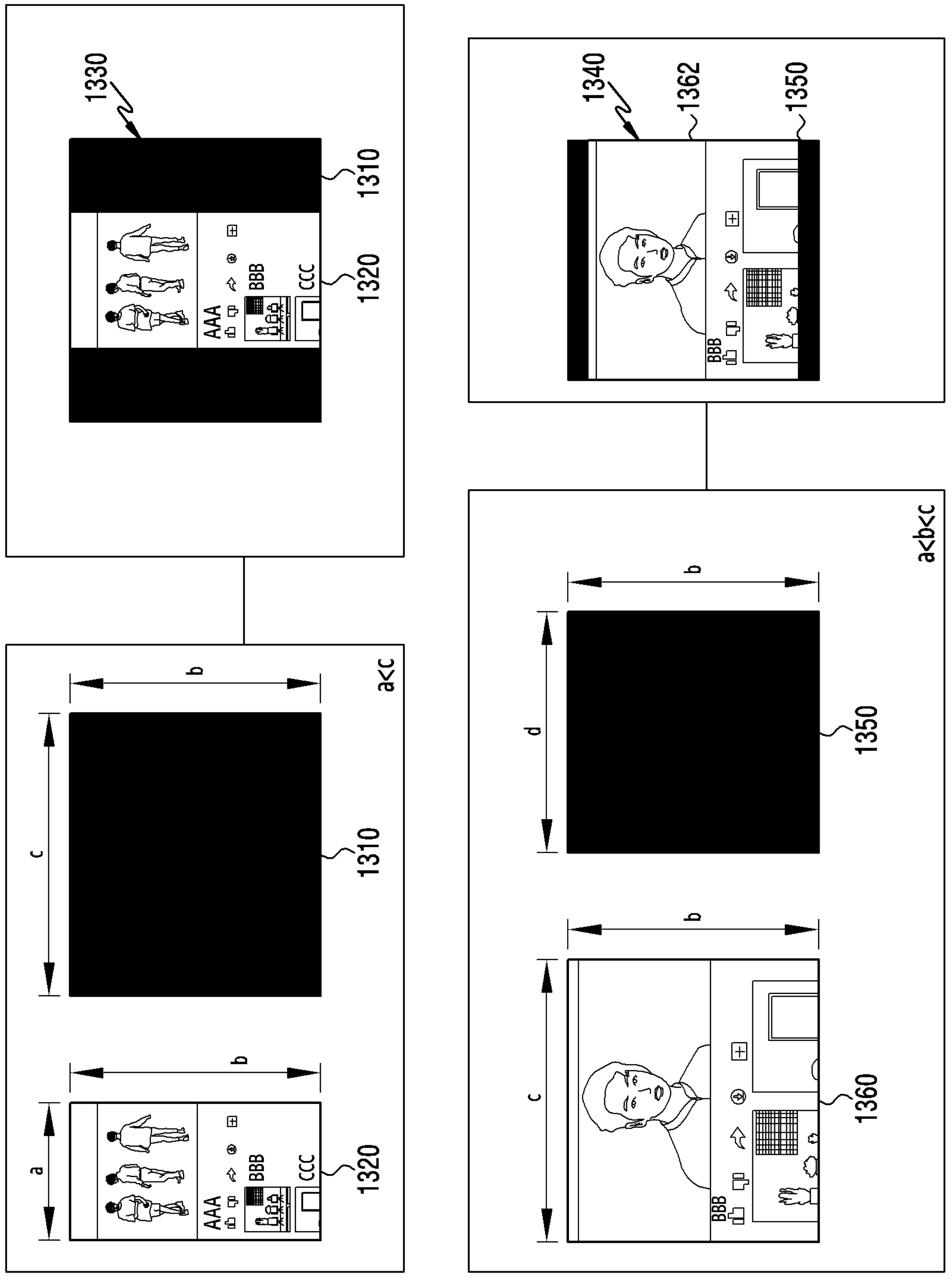
FIG. 13 is another example of a screen illustrating a method for reproducing a video by an electronic device according to an embodiment of the disclosure.

FIG. 13 is another example of a screen showing a method for reproducing a video by an electronic device according to an embodiment of the disclosure.

FIG. 13 illustrates a case in which screen size has not been changed during recording and the screen size of the display 120 is different from the size of a video during reproduction.

The screen size may remain fixed. The video may be scaled (expanded or reduced) to correspond to the screen size.

Reference numeral 1310 denotes a first screen. Reference numeral 1320 denotes a first recorded video. The size (width c*height b) of the first screen 1310 may be larger than the size (width a*height b) of the first recorded video 1320 (a<c). When the first screen 1310, which is the current screen of the display 120, is larger than the first recorded video 1320, as shown by reference numeral 1330, the first recorded video 1320 may be aligned in the center and processed to be in the middle of the first recorded video 1320.

Reference numeral 1350 denotes a second screen. Reference numeral 1360 denotes a second recorded video. The size (width d*height b) of the second screen 1350 may be smaller than the size (width c*height b) of the second recorded video 1360 (a<d<c). When the size of the second screen 1350, which is the current screen of the display 120, is smaller than the size of the second recorded video 1360, the second recorded video 1360 may be scaled (reduced) to correspond to the size of the second screen 1350. The scaling process may be performed in a state in which the aspect ratio of the video is maintained. As shown by reference numeral 1340, the scaled second recorded video 1362 may be displayed on the second screen 1350.

Figure 14:
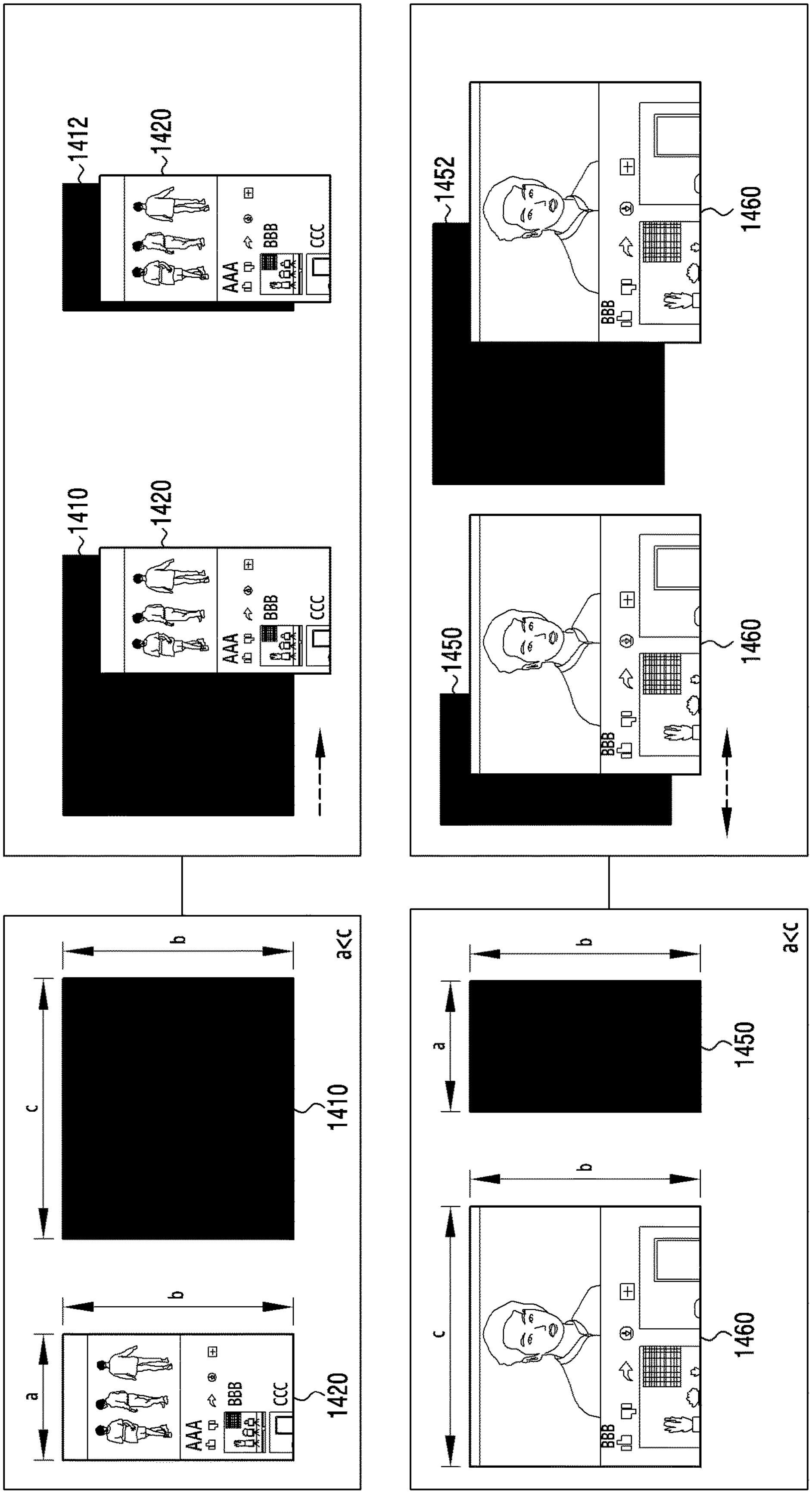
FIG. 14 is still another example of a screen illustrating a method for reproducing a video by an electronic device according to an embodiment of the disclosure.

FIG. 14 is another example of a screen showing a method for reproducing a video by an electronic device according to an embodiment of the disclosure.

FIG. 14 illustrates a case in which screen size has not been changed during recording and the screen size of the display 120 is different from the size of a video during reproduction.

The size of the video may remain fixed. The screen size may be changed (expanded or reduced) to correspond to the size of the video. An option to match the screen size of the display 120 to the size of the video being reproduced may be preconfigured by a user.

Reference numeral 1410 denotes a first screen. Reference numeral 1420 denotes a first recorded video. The size of the first screen 1410 may be larger than the size of the first recorded video 1420. When the size (width c*height b) of the first screen 1410, which is the current screen of the display 120, is greater than the size (width a*height b) of the first recorded video 1420 (a<c), the first screen 1410 may be reduced to correspond to the size of the first recorded video 1420. The first recorded video 1420 may be displayed on the reduced first screen 1412.

Reference numeral 1450 denotes a second screen. Reference numeral 1460 denotes a second recorded video. The size (width a*height b) of the second screen 1450 may be greater than the size (width c*height b) of the second recorded video 1460 (a<c). When the second screen 1450, which is the current screen of the display 120, is smaller than the second recorded video 1460, the second screen 1450 may be expanded to correspond to the size of the second recorded video 1460. The second recorded video 1460 may be displayed on the expanded second screen 1452.

Figure 15:
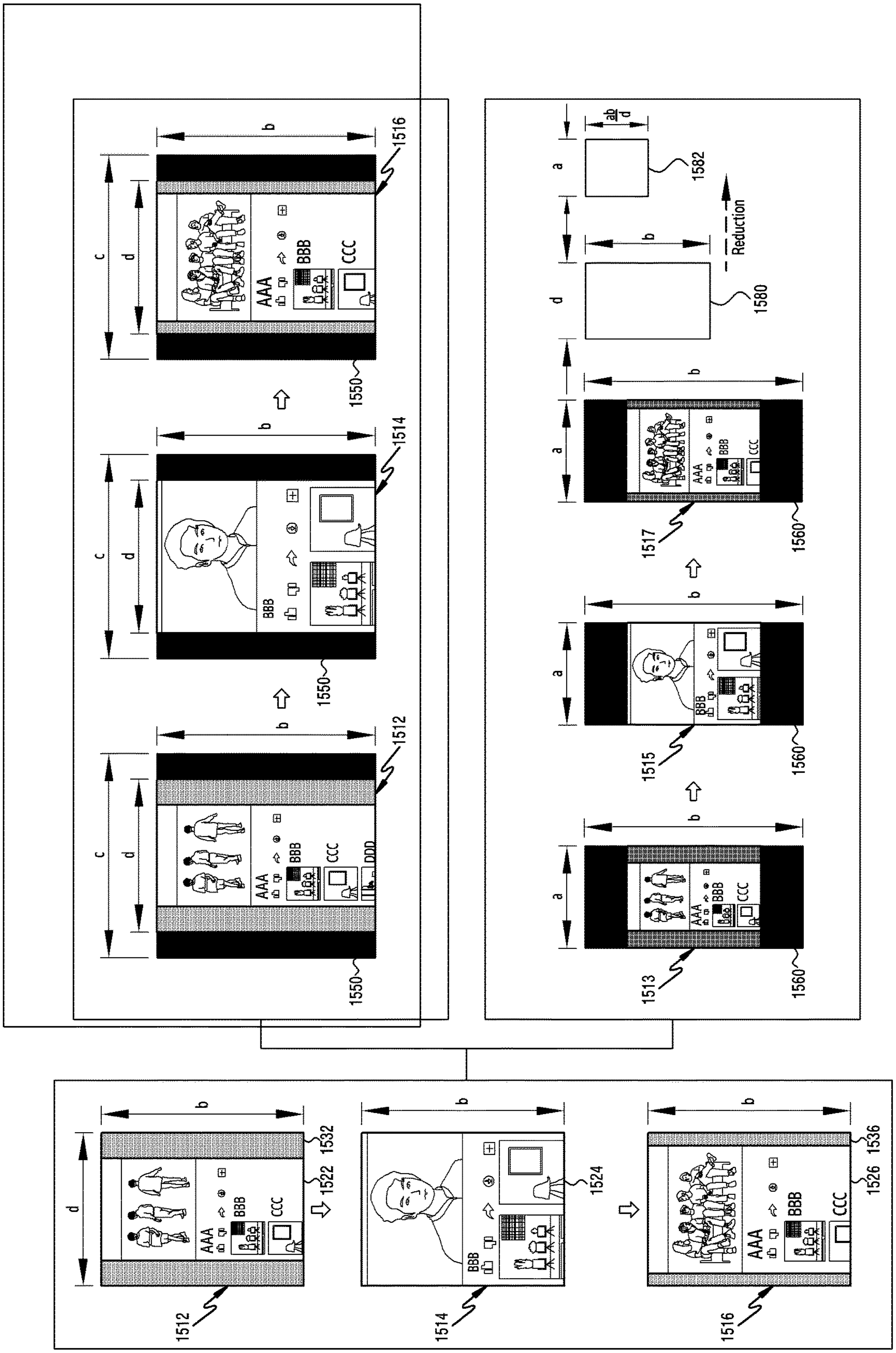
FIG. 15 is still another example of a screen illustrating a method for reproducing a video by an electronic device according to an embodiment of the disclosure.

FIG. 15 is another example of a screen showing a method for reproducing a video by an electronic device according to an embodiment of the disclosure.

FIG. 15 illustrates a case in which screen size has been changed during recording.

Reference numerals 1512, 1514 and 1516 denote frames of one recorded video. When screen size has been changed during recording, frames 1512, 1514, and 1516 in which recording areas of different sizes are recorded (or stored) may be stored as one video. Reference numerals 1522, 1524 and 1526 denote recording areas (actual recording areas) within the respective frames. Reference numerals 1532 and 1536 denote dummy areas.

The size of the video may correspond to the largest screen size (the maximum screen size during recording) among recording areas in the video.

For example, as shown, the recorded video may include a first frame 1512 obtained by recording a screen of a first size (e.g., a basic screen size), a second frame 1514 obtained by recording a screen of a second size (e.g., the maximum screen size), and a third frame 1516 obtained by recording a screen of a third size (e.g., an intermediate screen size).

When the size of the recording area 1524 in the second frame 1514 is the largest, the size of the second frame 1514 may be the size of the video. The video formats (e.g., size-related attribute) of the first frame 1512 and the third frame 1516 may be modified based on the second frame 1514.

When the format is modified, dummy areas 1532 and 1536 may be added to the first frame 1512 and the third frame 1516, respectively. The dummy areas 1532 and 1536 may be blanked or blackened. The first frame 1512 may include an actual recording area 1522 in which the second screen is recorded, and a dummy area 1532 corresponding to the difference between the size of the video and the size of the second screen. The third frame 1516 may include an actual recording area 1526 in which the third screen is recorded, and a dummy area 1536 corresponding to the difference between the size of the video and the size of the third screen.

The first frame 1512, the second frame 1514, and the third frame 1516 in which recording areas of different sizes are recorded may be modified according to one video format (e.g., the size of the second frame 1514, width d*height b) and be stored as one recorded video.

When reproducing a video, the recorded video may be scaled (expanded or reduced) to correspond to the screen size (current screen size) of the display 120.

Reference numeral 1550 denotes a first screen (current screen) of the display 120 having a first size (width c*height b). When the current screen size (width c*height b) of the display 120 is greater than the size (width d*height b) of the video (d<c), the frames 1512, 1514, and 1516 of the video may be aligned in the center and be sequentially displayed in the middle of the first screen 1550.

Reference numeral 1560 denotes a second screen (current screen) of the display 120 having a second size (width a*length b). When the current screen size (width a*height b) of the display 120 is smaller than the size (width d*height b) of the video (a<d<c), the video may be scaled (reduced) and the frames 1513, 1515, and 1517 of the reduced video may be displayed on the second screen 1560.

Reference numerals 1580 and 1582 are examples for explaining video scaling processing. A video of the first size (width d*height b) may be reduced to a second size (width a*height ab/d) by scaling. The aspect ratio of the video may be maintained.

Figure 16:
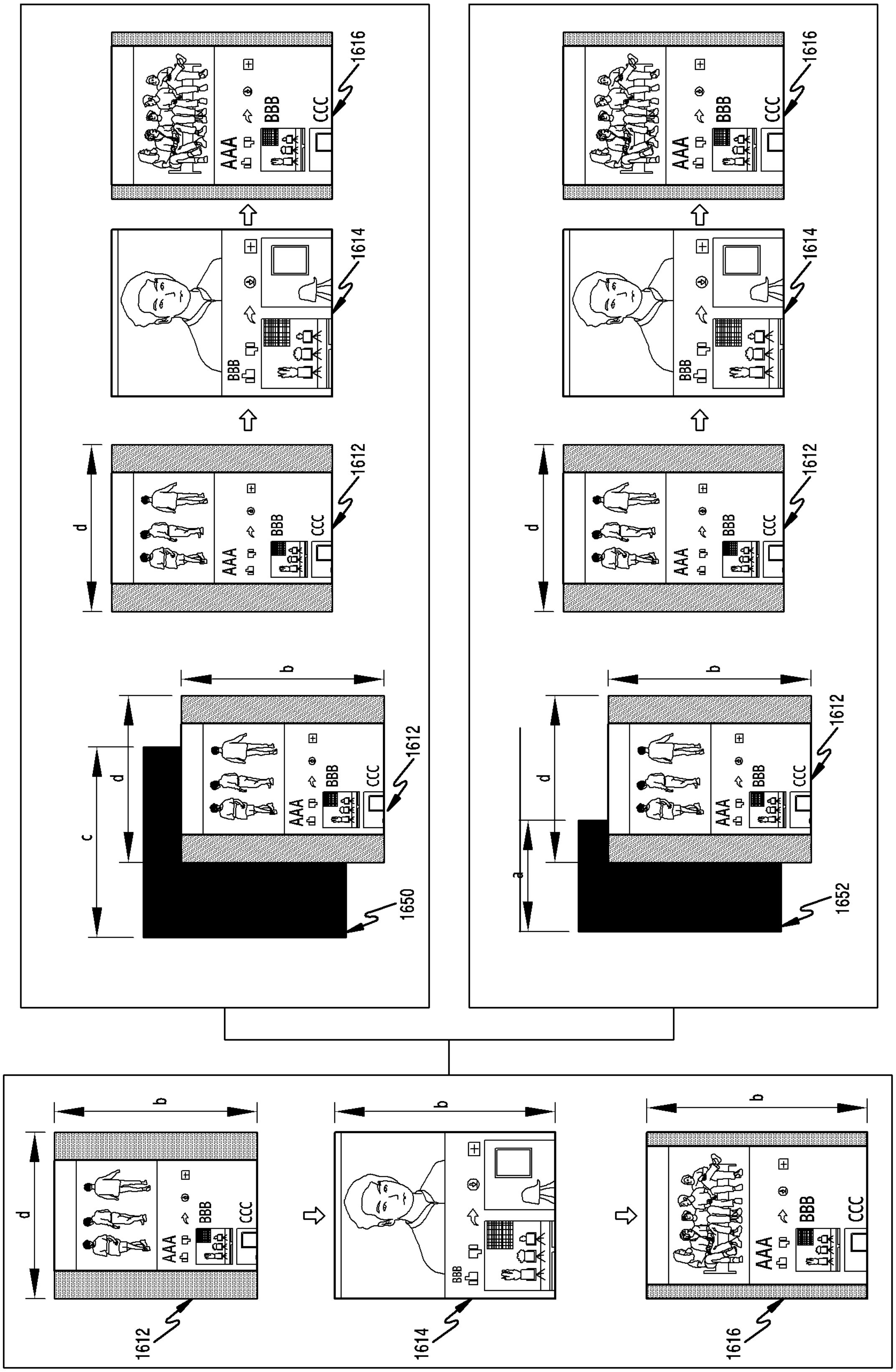
FIG. 16 is still another example of a screen illustrating a method for reproducing a video by an electronic device according to an embodiment of the disclosure.

FIG. 16 is another example of a screen showing a method for reproducing a video by an electronic device according to an embodiment of the disclosure.

FIG. 16 illustrates a case in which screen size has been changed during recording.

Reference numerals 1612, 1614 and 1616 denote frames of one recorded video. The recorded video may include frames 1612, 1614, and 1616 in which recording areas of different sizes are recorded (or stored). The size of the video may correspond to the largest screen size (maximum screen size during recording) among the recording areas in the video.

The size of the second frame 1614 obtained by recording the second screen, which is the maximum screen size during recording, may be the size of the video (width d*length b). The video formats (e.g., size-related attribute) of the first frame 1612 and the third frame 1616 may be modified according to the second frame 1614. The first frame 1612 and the third frame 1616 may include a dummy area added to be fitted to the video format of the second frame 1614.

The size of the video may remain fixed. The screen size may be automatically changed (expanded or reduced) to correspond to the size of the video. For storage, an option for automatically adjusting the screen size of the display 120 to the size of the video being reproduced may be preconfigured by a user.

Reference numeral 1650 denotes a first screen (current screen) of the display 120 having a first size (width c*length b). When the size (width c*height b) of the first screen, which is the current screen is larger than the size (width d*height b) of the video (d<c), the first screen 1650 may be automatically reduced to the size of the video. Frames 1612, 1614, and 1616 of the recorded video may be sequentially displayed on the automatically reduced first screen.

Reference numeral 1652 denotes a second screen (current screen) of the display 120 having a second size (width a*length b). When the size (width a*height b) of the second screen, which is the current screen, is smaller than the size (width d*height b) of the video (a<d), the second screen 1652 may be automatically expanded to the size of the video. Frames 1612, 1614, and 1616 of the recorded video may be sequentially displayed on the automatically expanded second screen.

Figure 17:
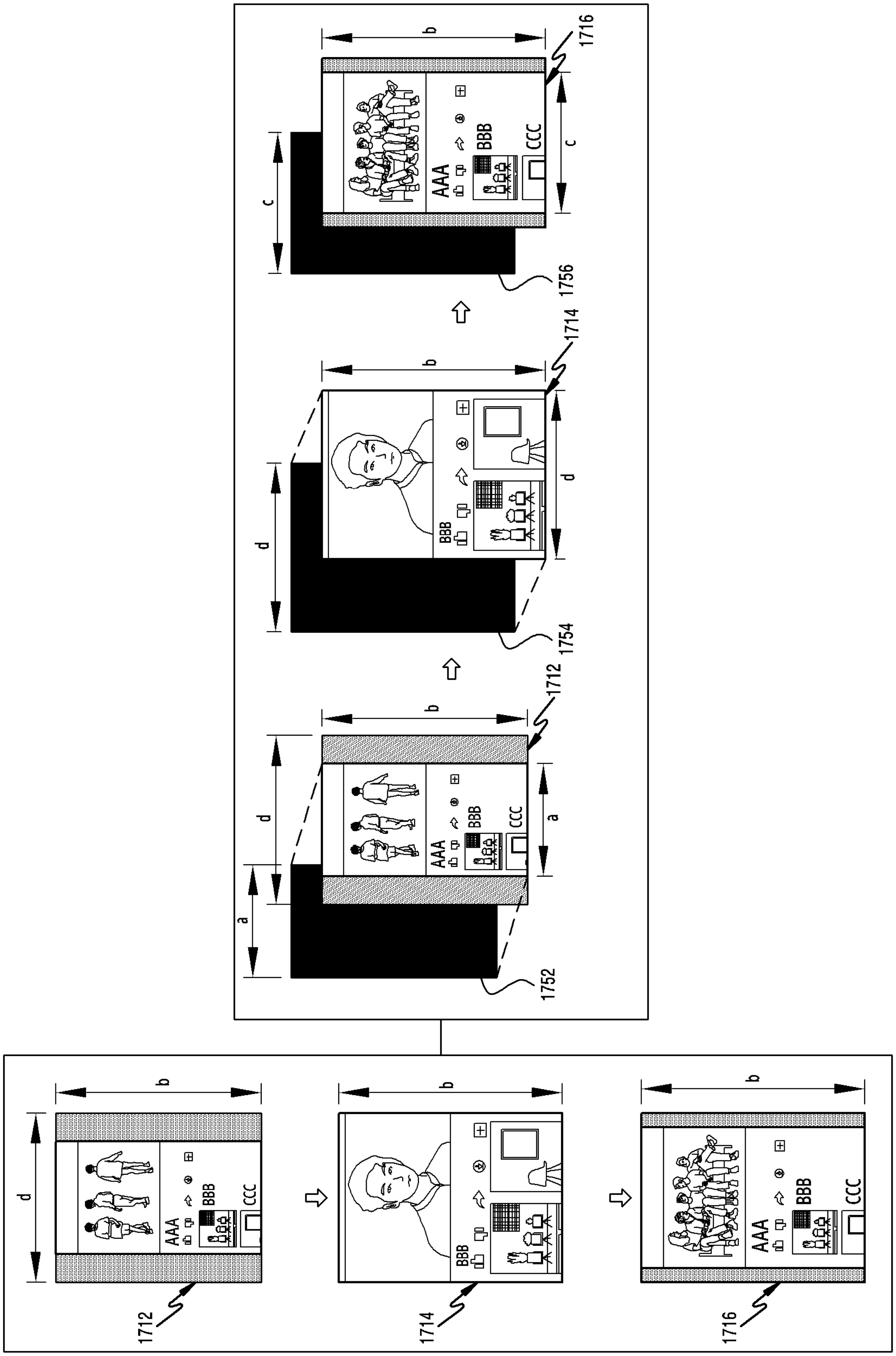
FIG. 17 is still another example of a screen illustrating a method for reproducing a video by an electronic device according to an embodiment of the disclosure.

FIG. 17 is another example of a screen showing a method for reproducing a video by an electronic device according to an embodiment of the disclosure.

FIG. 17 illustrates a case in which screen size has been changed during recording and screen size change information on the recorded video is stored.

Reference numerals 1712, 1714 and 1716 denote frames of one recorded video. The recorded video may include frames 1712, 1714, and 1716 in which recording areas of different sizes are recorded (or stored). The size of the video may correspond to the largest screen size (maximum screen size during recording) among the recording areas in the video.

The size of the second frame 1714 obtained by recording the second screen of the maximum screen size during recording may be the size of the video. The video formats (e.g., size-related attribute) of the first frame 1712 and the third frame 1716 may be modified according to the second frame 1714. The first frame 1712 and the third frame 1716 may include a dummy area added to be fitted to the video format of the second frame 1714.

The size of the video may remain fixed. An option for automatically adjusting the screen size of the display 120 to the size of the video being reproduced may be preconfigured by a user. The screen size may be automatically changed (expanded or reduced) in frame units instead of video units. The screen size of the display 120 may be varied in response to the size of the recording area (actual screen area) of each frame.

Reference numerals 1752, 1754, and 1756 denote a first screen, a second screen, and a third screen, respectively, which are resized according to the size of the recording areas in the frames 1712, 1714, and 1716.

The size (width a*height b) of the first screen 1752 may be changed to correspond to the size (width a*height b) of the recording area in the first frame 1712. The size (width d*height b) of the second screen 1754 may be changed to correspond to the size (width d*height b) of the recording area in the second frame 1714. The size (width c*height b) of the third screen 1756 may be changed to correspond to the size (width c*height b) of the recording area in the third frame 1716.

Figure 18:
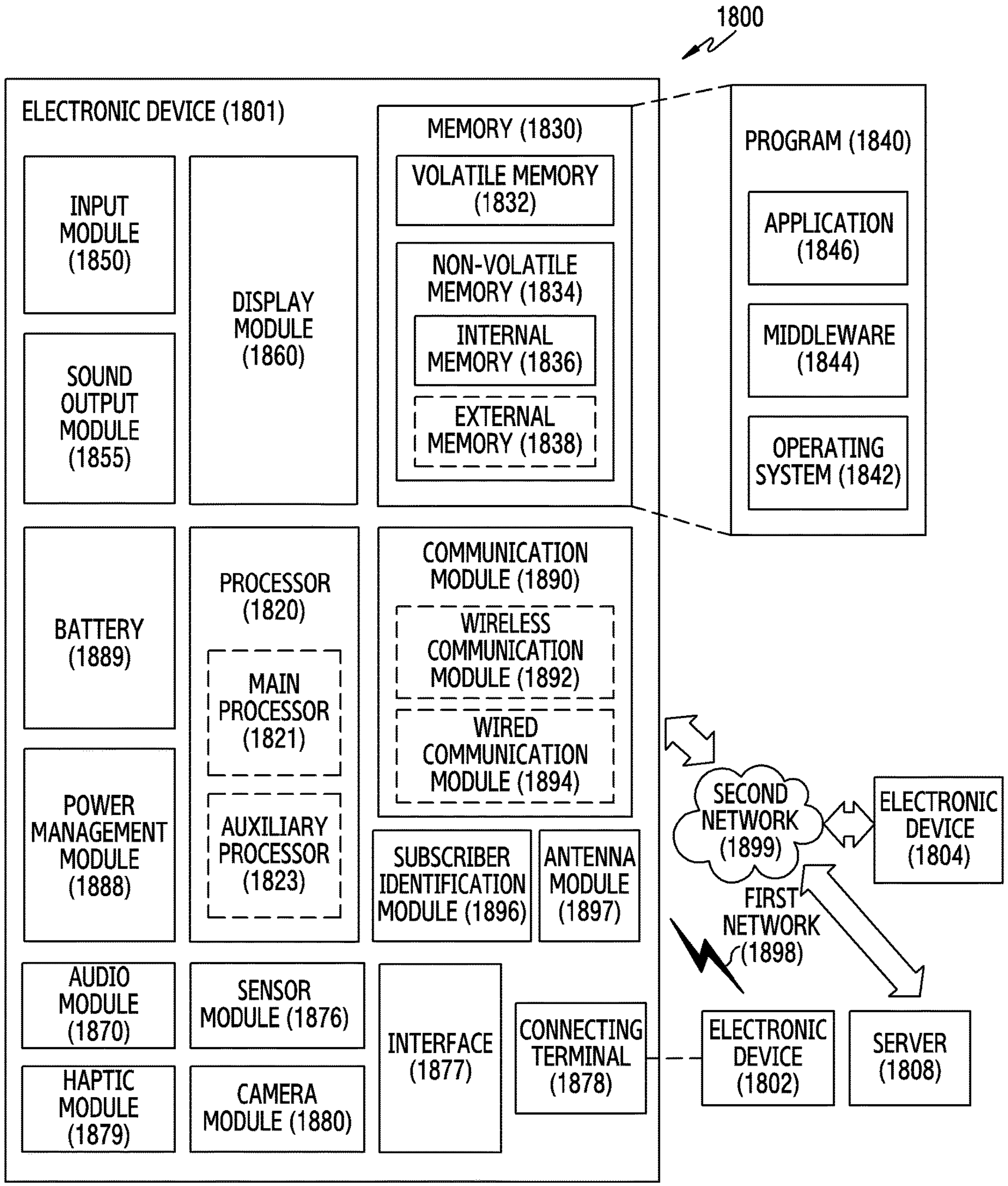
FIG. 18 is a block diagram of an electronic device in a network environment according to an embodiment of the disclosure.

FIG. 18 is a block diagram illustrating an electronic device 1801 in a network environment 1800 according to an embodiment of the disclosure.

Referring to FIG. 18, the electronic device 1801 in the network environment 1800 may communicate with an electronic device 1802 via a first network 1898 (e.g., a short-range wireless communication network), or at least one of an electronic device 1804 or a server 1808 via a second network 1899 (e.g., a long-range wireless communication network). According to an embodiment, the electronic device 1801 may communicate with the electronic device 1804 via the server 1808. According to an embodiment, the electronic device 1801 may include a processor 1820, memory 1830, an input module 1850, a sound output module 1855, a display module 1860, an audio module 1870, a sensor module 1876, an interface 1877, a connecting terminal 1878, a haptic module 1879, a camera module 1880, a power management module 1888, a battery 1889, a communication module 1890, a subscriber identification module (SIM) 1896, or an antenna module 1897. In some embodiments, at least one of the components (e.g., the connecting terminal 1878) may be omitted from the electronic device 1801, or one or more other components may be added in the electronic device 1801. In some embodiments, some of the components (e.g., the sensor module 1876, the camera module 1880, or the antenna module 1897) may be implemented as a single component (e.g., the display module 1860).

The processor 1820 may execute, for example, software (e.g., a program 1840) to control at least one other component (e.g., a hardware or software component) of the electronic device 1801 coupled with the processor 1820, and may perform various data processing or computation. According to one embodiment, as at least part of the data processing or computation, the processor 1820 may store a command or data received from another component (e.g., the sensor module 1876 or the communication module 1890) in volatile memory 1832, process the command or the data stored in the volatile memory 1832, and store resulting data in non-volatile memory 1834. According to an embodiment, the processor 1820 may include a main processor 1821 (e.g., a central processing unit (CPU) or an application processor (AP)), or an auxiliary processor 1823 (e.g., a graphics processing unit (GPU), a neural processing unit (NPU), an image signal processor (ISP), a sensor hub processor, or a communication processor (CP)) that is operable independently from, or in conjunction with, the main processor 1821. For example, when the electronic device 1801 includes the main processor 1821 and the auxiliary processor 1823, the auxiliary processor 1823 may be adapted to consume less power than the main processor 1821, or to be specific to a specified function. The auxiliary processor 1823 may be implemented as separate from, or as part of the main processor 1821.

The auxiliary processor 1823 may control at least some of functions or states related to at least one component (e.g., the display module 1860, the sensor module 1876, or the communication module 1890) among the components of the electronic device 1801, instead of the main processor 1821 while the main processor 1821 is in an inactive (e.g., sleep) state, or together with the main processor 1821 while the main processor 1821 is in an active state (e.g., executing an application). According to an embodiment, the auxiliary processor 1823 (e.g., an image signal processor or a communication processor) may be implemented as part of another component (e.g., the camera module 1880 or the communication module 1890) functionally related to the auxiliary processor 1823. According to an embodiment, the auxiliary processor 1823 (e.g., the neural processing unit) may include a hardware structure specified for artificial intelligence model processing. An artificial intelligence model may be generated by machine learning. Such learning may be performed, e.g., by the electronic device 1801 where the artificial intelligence is performed or via a separate server (e.g., the server 1808). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1830 may store various data used by at least one component (e.g., the processor 1820 or the sensor module 1876) of the electronic device 1801. The various data may include, for example, software (e.g., the program 1840) and input data or output data for a command related thereto. The memory 1830 may include the volatile memory 1832 or the non-volatile memory 1834.

The program 1840 may be stored in the memory 1830 as software, and may include, for example, an operating system (OS) 1842, middleware 1844, or an application 1846.

The input module 1850 may receive a command or data to be used by another component (e.g., the processor 1820) of the electronic device 1801, from the outside (e.g., a user) of the electronic device 1801. The input module 1850 may include, for example, a microphone, a mouse, a keyboard, a key (e.g., a button), or a digital pen (e.g., a stylus pen).

The sound output module 1855 may output sound signals to the outside of the electronic device 1801. The sound output module 1855 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1860 may visually provide information to the outside (e.g., a user) of the electronic device 1801. The display module 1860 may include, for example, a display, a hologram device, or a projector and control circuitry to control a corresponding one of the display, hologram device, and projector. According to an embodiment, the display module 1860 may include a touch sensor adapted to detect a touch, or a pressure sensor adapted to measure the intensity of force incurred by the touch.

The audio module 1870 may convert a sound into an electrical signal and vice versa. According to an embodiment, the audio module 1870 may obtain the sound via the input module 1850, or output the sound via the sound output module 1855 or a headphone of an external electronic device (e.g., an electronic device 1802) directly (e.g., wiredly) or wirelessly coupled with the electronic device 1801.

The sensor module 1876 may detect an operational state (e.g., power or temperature) of the electronic device 1801 or an environmental state (e.g., a state of a user) external to the electronic device 1801, and then generate an electrical signal or data value corresponding to the detected state. According to an embodiment, the sensor module 1876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1877 may support one or more specified protocols to be used for the electronic device 1801 to be coupled with the external electronic device (e.g., the electronic device 1802) directly (e.g., wiredly) or wirelessly. According to an embodiment, the interface 1877 may include, for example, a high definition multimedia interface (HDMI), a universal serial bus (USB) interface, a secure digital (SD) card interface, or an audio interface.

A connecting terminal 1878 may include a connector via which the electronic device 1801 may be physically connected with the external electronic device (e.g., the electronic device 1802). According to an embodiment, the connecting terminal 1878 may include, for example, a HDMI connector, a USB connector, an SD card connector, or an audio connector (e.g., a headphone connector).

The haptic module 1879 may convert an electrical signal into a mechanical stimulus (e.g., a vibration or a movement) or electrical stimulus which may be recognized by a user via his tactile sensation or kinesthetic sensation. According to an embodiment, the haptic module 1879 may include, for example, a motor, a piezoelectric element, or an electric stimulator.

The camera module 1880 may capture a still image or moving images. According to an embodiment, the camera module 1880 may include one or more lenses, image sensors, image signal processors, or flashes.

The power management module 1888 may manage power supplied to the electronic device 1801. According to one embodiment, the power management module 1888 may be implemented as at least part of, for example, a power management integrated circuit (PMIC).

The battery 1889 may supply power to at least one component of the electronic device 1801. According to an embodiment, the battery 1889 may include, for example, a primary cell which is not rechargeable, a secondary cell which is rechargeable, or a fuel cell.

The communication module 1890 may support establishing a direct (e.g., wired) communication channel or a wireless communication channel between the electronic device 1801 and the external electronic device (e.g., the electronic device 1802, the electronic device 1804, or the server 1808) and performing communication via the established communication channel. The communication module 1890 may include one or more communication processors that are operable independently from the processor 1820 (e.g., the application processor (AP)) and supports a direct (e.g., wired) communication or a wireless communication. According to an embodiment, the communication module 1890 may include a wireless communication module 1892 (e.g., a cellular communication module, a short-range wireless communication module, or a global navigation satellite system (GNSS) communication module) or a wired communication module 1894 (e.g., a local area network (LAN) communication module or a power line communication (PLC) module). A corresponding one of these communication modules may communicate with the external electronic device via the first network 1898 (e.g., a short-range communication network, such as Bluetooth™, wireless-fidelity (Wi-Fi) direct, or infrared data association (IrDA)) or the second network 1899 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1892 may identify and authenticate the electronic device 1801 in a communication network, such as the first network 1898 or the second network 1899, using subscriber information (e.g., international mobile subscriber identity (IMSI)) stored in the subscriber identification module 1896.

The wireless communication module 1892 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1892 may support a high-frequency band (e.g., the millimeter wave (mmWave) band) to achieve, e.g., a high data transmission rate. The wireless communication module 1892 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1892 may support various requirements specified in the electronic device 1801, an external electronic device (e.g., the electronic device 1804), or a network system (e.g., the second network 1899). According to an embodiment, the wireless communication module 1892 may support a peak data rate (e.g., 20 gigabits per second (Gbps) or more) for implementing eMBB, loss coverage (e.g., 1864 dB or less) for implementing mMTC, or U-plane latency (e.g., 0.5 ms or less for each of downlink (DL) and uplink (UL), or a round trip of 18 ms or less) for implementing URLLC.

The antenna module 1897 may transmit or receive a signal or power to or from the outside (e.g., the external electronic device) of the electronic device 1801. According to an embodiment, the antenna module 1897 may include an antenna including a radiating element composed of a conductive material or a conductive pattern formed in or on a substrate (e.g., a printed circuit board (PCB)). According to an embodiment, the antenna module 1897 may include a plurality of antennas (e.g., array antennas). In such a case, at least one antenna appropriate for a communication scheme used in the communication network, such as the first network 1898 or the second network 1899, may be selected, for example, by the communication module 1890 (e.g., the wireless communication module 1892) from the plurality of antennas. The signal or the power may then be transmitted or received between the communication module 1890 and the external electronic device via the selected at least one antenna. According to an embodiment, another component (e.g., a radio frequency integrated circuit (RFIC)) other than the radiating element may be additionally formed as part of the antenna module 1897.

According to various embodiments, the antenna module 1897 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1801 and the external electronic device 1804 via the server 1808 coupled with the second network 1899. Each of the electronic devices 1802 or 1804 may be a device of a same type as, or a different type, from the electronic device 1801. According to an embodiment, all or some of operations to be executed at the electronic device 1801 may be executed at one or more of the external electronic devices 1802, 1804, or 1808. For example, if the electronic device 1801 should perform a function or a service automatically, or in response to a request from a user or another device, the electronic device 1801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1801. The electronic device 1801 may provide the outcome, with or without further processing of the outcome, as at least part of a reply to the request. To that end, a cloud computing, distributed computing, mobile edge computing (MEC), or client-server computing technology may be used, for example. The electronic device 1801 may provide ultra low-latency services using, e.g., distributed computing or mobile edge computing. In another embodiment, the external electronic device 1804 may include an internet-of-things (IoT) device. The server 1808 may be an intelligent server using machine learning and/or a neural network. According to an embodiment, the external electronic device 1804 or the server 1808 may be included in the second network 1899. The electronic device 1801 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1840) including one or more instructions that are stored in a storage medium (e.g., internal memory 1836 or external memory 1838) that is readable by a machine (e.g., the electronic device 1801). For example, a processor (e.g., the processor 1820) of the machine (e.g., the electronic device 1801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

An electronic device (e.g., any one of the electronic device 100 in FIG. 1, the electronic device 200 in FIGS. 2A and 2B, or the electronic device 300 in FIGS. 3A and 3B) according to various embodiments may include a memory (e.g., the memory 130 in FIG. 1), a display having a flexible structure (e.g., any one of the display 120 in FIG. 1, the display 220 in FIGS. 2A and 2B, or the display 320 in FIGS. 3A and 3B), at least one sensor (e.g., the sensor module 140 in FIG. 1) configured to detect a change in screen size of the display, and at least one processor (e.g., the processor 110 in FIG. 1). The at least one processor may be connected to the memory, the display, and the at least one sensor. The memory may store instructions that, when executed, cause the at least one processor to record the screen of the display, based on a reference screen size equal to or greater than an actual screen size, and store a video (e.g., the recorded video in FIG. 8 (any one of 832, 834, 736), the recorded video in FIG. 9 (any one of 932, 924, 960)) in which a dummy area (e.g., the dummy area 854 or 864 in FIG. 8, the dummy area 954 in FIG. 9) corresponding to the difference between the actual screen size and the reference screen size is cropped from the recorded video.

According to various embodiments, the reference screen size may be the maximum screen size according to the maximally expanded display.

According to various embodiments, the instructions may cause the at least one processor to identify the dummy area in the recorded video, based on the difference between the actual screen size and the reference screen size, crop the dummy area from the recorded video, and store the video in which the dummy area is cropped from the recorded video.

According to various embodiments, the instructions may cause the at least one processor to detect, through the at least one sensor, whether the screen size of the display has been changed during recording, and when the screen size of the display has been changed, record the screen of the display, based on the reference screen size.

According to various embodiments, while the screen size of the display is fixed, the screen of the display may be recorded based on the fixed screen size, and the recorded video (e.g., the recorded video 912 in FIG. 9) may be stored as a first video. When the screen size of the display has been changed, the screen of the display may be recorded based on the reference screen size, and a second video (one of the recorded videos 932, 924, and 960 in FIG. 9) in which the dummy area is cropped from the recorded video may be stored.

According to various embodiments, when a partial recording area is configured on the screen of the display, a video in which an area other than the partial recording area is additionally cropped from the recorded video may be stored.

According to various embodiments, the actual screen size may be determined based on a screen size changing while the recording is performed.

According to various embodiments, the actual screen size may be the maximum screen size while the recording is performed.

According to various embodiments, screen size change information on the display may be stored while the recording is performed.

According to various embodiments, a screen ratio may be changed in response to a change in screen size of the display, the screen of the display may be recorded based on the reference screen size and reference screen ratio, and the video may be stored based on the actual screen size and actual screen ratio.

According to various embodiments, a video (e.g., the recorded video 912 in FIG. 9) having a smaller size between the first video (e.g., the recorded video 912 in FIG. 9) and the second video (e.g., the recorded video 912 in FIG. 9) may be modified and stored based on a reference video size (e.g., the size of the recorded video 924 in FIG. 9).

According to various embodiments, the reference video size may be the size of a video corresponding to the reference screen size or the size of a video having a larger size between the first video and the second video.

According to various embodiments, while the screen size of the display is fixed, the screen of the display may be recorded based on the fixed screen size, and a first partial recorded video (e.g., the partial recorded video 1052 in FIG. 10) corresponding to the partial recording area in the recorded video may be stored. When the screen size of the display has been changed, the screen of the display may be recorded based on the reference screen size, and a second partial recorded video (e.g., the partial recording video 1064 in FIG. 10) corresponding to the partial recording area in the recorded video may be stored.

According to various embodiments, the instructions may cause the at least one processor to reproduce the stored video and display the video on the display.

The electronic device 100 according to various embodiments may include a memory 130, a display 120 having a flexible structure, a sensor module 140 configured to detect a change in screen size of the display, and at least one processor 110. The at least one processor may be connected to the memory, the display, and the at least one sensor. The memory may store instructions that, when executed, cause the at least one processor to receive a request to reproduce a video in which the screen of the display is recorded, identify a change in sizes of recording areas in the video corresponding to frames of the video, and reproduce the video, based on changes in sizes of recording areas in the video to display the reproduced video on the display.

According to various embodiments, when the sizes of the recording areas in the video are fixed, the size of the video may be the same as the fixed sizes, and the video may be displayed based on a comparison between the screen size of the display and the size of the video.

According to various embodiments, the video may be displayed to correspond to the screen size of the display while the screen size of the display is fixed, or the screen size of the display may be changed to correspond to the size of the video.

According to various embodiments, the instructions may cause the at least one processor to detect a change in screen size of the display through the at least one sensor while the reproduction is performed, and reproduce and display the video, based on the changed screen size of the display and the size of the video.

According to various embodiments, when the sizes of the recording areas in the video have been changed, the size of the video may be the same as the maximum size among the sizes of the recording areas, and the video may be displayed based on a comparison between the screen size of the display and the size of the video.

According to various embodiments, when the sizes of the recording areas in the video have been changed, the screen size of the display may be changed to correspond to change in sizes of the recording areas, and the video may be displayed through the resized screen.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a housing including a first housing part and a second housing part configured to movably engage with the first housing part between a retracted position and an extended position;

a flexible display coupled to the first housing part and the second housing part such that a size of an area of the flexible display that is visible from a front side of the housing changes as the housing is moved between the retracted position and the extended position;

at least one sensor;

at least one processor; and memory storing instructions that, when executed by the at least one processor, cause the electronic device to:

record a video for screens displayed on the area of the flexible display, based on a maximum size of the area, detect, through the at least one sensor, the size of the area during recording of the video, after recording of the video is completed, identify whether the size of the area has been changed from a first size to a second size less than or equal to the maximum size during recording of the video, if the size of the area has been changed from the first size to the second size, store a first video from the recorded video based on the maximum size of the area, and if the size of the area has not been changed, store a second video from the recorded video based on the first size of the area.

2. The electronic device of claim 1, wherein the second video is a video in which a dummy area corresponding to a difference between the size of the area and the maximum size of the area is cropped from the recorded video.

3. The electronic device of claim 2, wherein the instructions further cause the electronic device to:

identify the dummy area in the recorded video, based on the difference between the size of the area and the maximum size of the area;

crop the dummy area from the recorded video; and store the second video in which the dummy area is cropped from the recorded video.

4. The electronic device of claim 2, wherein the instructions further cause the electronic device to:

in case that a partial recording area is configured on the area of the flexible display, store a video in which an area other than the partial recording area is additionally cropped from the recorded video.

5. The electronic device of claim 1, wherein the instructions further cause the electronic device to:

change a screen ratio in response to a change in sizes of the area of the flexible display, record the video for the screens displayed on the area of the flexible display based on the maximum size and a first screen ratio, store the first video based on the maximum size of the area and the first screen ratio, and store the second video based on the size of the area and a second screen ratio.

6. The electronic device of claim 1, wherein the instructions further cause the electronic device to:

in case that the electronic device is in a low power state, display a notification window indicating that a reduction or an expansion of the area is not possible.

7. The electronic device of claim 1, wherein the instructions further cause the electronic device to:

in case that the electronic device is in a low power state, perform recording based on the size of the area without changing the size of the area.

8. An electronic device comprising:

a housing including a first housing part and a second housing part configured to movably engage with the first housing part between a retracted position and an extended position;

a flexible display coupled to the first housing part and the second housing part such that a size of an area of the flexible display that is visible from a front side of the housing changes as the housing is moved between the retracted position and the extended position;

at least one sensor;

at least one processor; and memory storing instructions that, when executed by the at least one processor, cause the electronic device to:

receive a request to reproduce a video in which screens, displayed on the area of the flexible display, are recorded, identify whether a size of the area has been changed from a first size to a second size less than or equal to a maximum size during recording of the video based on frames in the video, if the size of the area has been changed from the first size to the second size during recording of the video, reproduce the video, based on the maximum size of the area to display the reproduced video on the flexible display, and if the size of the area is not changed during recording of the video, reproduce the video based on the first size of the area to display the reproduced video on the flexible display.

9. The electronic device of claim 8, wherein, in case that sizes of the frames in the video have been fixed, the instructions further cause the electronic device to:

identify that a size of the video is identical to the fixed sizes, and display the video based on a comparison between the maximum size of the area and the size of the video.

10. The electronic device of claim 8, wherein the instructions further cause the electronic device to:

detect a change in the size of the area through the at least one sensor while the reproduction is performed; and reproduce and display the video, based on the changed size of the area and a size of the video.

11. The electronic device of claim 8, wherein, in case that sizes of the frames in the video have been changed, the instructions further cause the electronic device to:

identify that a size of the video is identical to maximum size among sizes of the frames in the video, and display the video based on a comparison between the maximum size of the area and the size of the video.

12. The electronic device of claim 8, wherein, in case that sizes of the frames in the video have been changed, the instructions further cause the electronic device to:

change the size of the area of the flexible display to correspond to a change in sizes of frames in the video, and display the video through the resized area of the flexible display.

13. The electronic device of claim 8, wherein the instructions further cause the electronic device to:

in case that the electronic device is in a low power state, display a notification window indicating that a reduction or an expansion of the area is not possible.

14. The electronic device of claim 8, wherein the instructions further cause the electronic device to:

in case that the electronic device is in a low power state, perform recording based on the size of the area without changing the size of the area.

15. The electronic device of claim 8, wherein the instructions further cause the electronic device to:

display frames of the video on the flexible display while changing a screen size of the flexible display to a first size, a second size, and then a third size to correspond to a screen size change history of the area during the recording.

* * * * *